US008568914B2

(12) United States Patent
Pol et al.

(10) Patent No.: US 8,568,914 B2
(45) Date of Patent: Oct. 29, 2013

(54) AUTOGENIC PRESSURE REACTIONS FOR BATTERY MATERIALS MANUFACTURE

(75) Inventors: Vilas G. Pol, Willowbrook, IL (US);
Swati V. Pol, Willowbrook, IL (US);
Michael M. Thackeray, Naperville, IL (US)

(73) Assignee: Uchicago Argonne, LLC, Chicago, IL (US)

( * ) Notice: Subject to any disclaimer, the term of this patent is extended or adjusted under 35 U.S.C. 154(b) by 402 days.

(21) Appl. No.: 12/915,395

(22) Filed: Oct. 29, 2010

(65) Prior Publication Data
US 2011/0104553 A1 May 5, 2011

Related U.S. Application Data

(60) Provisional application No. 61/360,027, filed on Jun. 30, 2010, provisional application No. 61/280,025, filed on Oct. 29, 2009.

(51) Int. Cl.
*H01M 6/42* (2006.01)
*H01M 4/13* (2010.01)

(52) U.S. Cl.
USPC ........................................ 429/156; 429/231.8

(58) Field of Classification Search
None
See application file for complete search history.

(56) References Cited

U.S. PATENT DOCUMENTS

| 5,643,508 | A * | 7/1997 | Ganguly et al. | 264/29.6 |
|---|---|---|---|---|
| 6,544,678 | B2 | 4/2003 | Faris et al. | |
| 7,060,390 | B2 | 6/2006 | Chen et al. | |
| 7,211,351 | B2 | 5/2007 | Klaassen | |
| 7,435,494 | B1 | 10/2008 | Rogers et al. | |
| 2004/0265587 | A1 | 12/2004 | Koyanagi et al. | |
| 2006/0057388 | A1 | 3/2006 | Jin et al. | |
| 2006/0078726 | A1 | 4/2006 | Antonio et al. | |
| 2006/0093885 | A1 | 5/2006 | Krusic et al. | |
| 2006/0286378 | A1 * | 12/2006 | Chiruvolu et al. | 428/402 |
| 2007/0009800 | A1 | 1/2007 | Barker et al. | |
| 2007/0160899 | A1 * | 7/2007 | Atanassova et al. | 429/44 |
| 2007/0212583 | A1 | 9/2007 | Johnson | |
| 2008/0070087 | A1 | 3/2008 | Johnson | |
| 2009/0011334 | A1 * | 1/2009 | Shizuka et al. | 429/223 |
| 2009/0117028 | A1 | 5/2009 | Kundu | |
| 2009/0117466 | A1 * | 5/2009 | Zhamu et al. | 429/231.8 |
| 2009/0169996 | A1 * | 7/2009 | Zhamu et al. | 429/221 |
| 2009/0191458 | A1 * | 7/2009 | Herle | 429/207 |

OTHER PUBLICATIONS

Pol, V. G. et al., Carbon Spherules: Synthesis, Properties and Mechanistic Elucidation, Carbon 42 111-116 (2004).

(Continued)

*Primary Examiner* — Patrick Ryan
*Assistant Examiner* — Jose Colucci Rios
(74) *Attorney, Agent, or Firm* — Olson & Cepuritis, Ltd.

(57) ABSTRACT

A lithium- or lithium-ion electrochemical cell of the present invention comprises a lithium-containing cathode, an anode, and a non-aqueous lithium-containing electrolyte therebetween; wherein one or more of the anode and the cathode comprises at least one particulate carbon-containing material selected from the group consisting of one or more carbon-coated metal oxide or metal phosphate particles, carbon-containing metals that alloy with Li, carbon-containing metalloids that alloy with Li, or rounded carbon particles such as carbon spheres, prolate-shaped spheroids, oblate-shaped spheroids, and carbon nanotubes. In a preferred embodiment, the particulate carbon material is prepared by reacting one or more solid, solvent-free chemical precursor materials comprising the elements making up the material in an enclosed autogenic pressure reactor in which the precursor materials are dissociated and reacted at elevated temperature, thereby creating self-generated pressure within the reactor.

20 Claims, 21 Drawing Sheets

(a)

(b)

(56) References Cited

OTHER PUBLICATIONS

Pol, V. G. et al., High Yield One-Step Synthesis of Carbon Spheres Produced by Dissociating Individual Hydrocarbons at their Autogenic . . . , Carbon 44, 3285-3292 (2006).

Pol V. G. et al., Catalyst-free, One-Step Synthesis of Olivary-Shaped Carbon From Olive Oil, Ind. Eng. Chem. Res. 48, 5691-5695 (2009).

Pol, V. G. et al., Synthesis of Monodispersed Prolate Spheroid Shaped Paramagnetic Carbon, Carbon 47, 1050-1055 (2009).

Pol, V. G. et al., Implementation of an Electric Field (AC and DC) for the Growth of Carbon Filaments via Reaction under Autogenic . . . , Chem. Mater. 18, 1512-1519 (2006).

Pol, V.G. et al., Measurement of Autogenous Pressure and Dissociated Species During the Thermolysis of Mesitylene for the . . . , Ind. Eng. Chem. Res. 48, 1484-1489 (2009).

Pol, V.G. et al., The Dependence of the Oriented Growth of Carbon Filaments on the Intensity of a Magnetic Field, Carbon 44, 1913-1918 (2006).

Pol, V.G. et al., Thermal Decomposition of Tetraethylorthosilicate (TEOS) Produces Silicon Coated Carbon Spheres, J. Mater. Chem. 14, 966-969 (2004).

Pol, V.G. et al., Sonochemical Deposition of Air-Stable Iron Nanoparticles on Monodispersed Carbon Spherules, Chem. Mater. 15, 1378-1384 (2003).

Pol, V.G. et al., A Solvent Free Process for the Generation of Strong, Conducting Carbon Spheres by the Thermal Degradation . . . Green Chemical, 11, 448-451 (2009).

Koltypin M. et al., The Study of Carbon-Coated V2O5 Nanoparticles as a Potential Cathodic Material . . . , Journal of the Electrochemical Society, 154 (7), A606-A613 (2007).

Pol, S. V. et al., Encapsulating ZnS and ZnSe Nanocrystals in the Carbon Shell: A RAPET Approach, J. Phys. Chem C, 111, 13309-13314 (2007).

Odani A. et al., Testing Carbon-Coated VOx Prepared via Reaction Under Autogenic Pressure at Elevated Temperature . . . Adv. Mater. 18, 1431-1436 (2006).

Pol S. V. et al., Reactions Under Autogenic Pressure at Elevated Temperature (RAPET) of Various Alkoxides . . . Chem. Eur. J. 10, 4467-4473 (2004).

Pol V. G., Semiconducting, Magnetic or Superconducting Nanoparticles Encapsulated in Carbon Shells by RAPET Method, Carbon-Sci. Tech. 1, 46-56 (2008).

Pol V.G. et al., High Yield One-Step Synthesis of Carbon Spheres Produced by Dissociating Individual Hydrocarbons at Their Autogenic . . . , Carbon 44, 3285-3292 (2006).

Wang, Y. et al., Nano Active Materials for Lithium-Ion Batteries, The Royal Society of Chemistry, Nanoscale (2010).

Wang, Q. et al., Monodispersed Hard Carbon Spherules With Uniform Nanopores, Carbon 39 (2001), 2211-2214.

Inagaki, M. et al., Pressure Carbonization of Polyethylene-Polyvinylchloride Mixtures, Carbon 21 (3) (1983), 231-235.

Ayache, J. et al., Mechanism of Carbonization Under Pressure, Part I: Influence of Aromaticity (Polyethylene and Anthracene), Carbon 28, 2/3 (1990), 337-351I.

Yang et al., Nanographene-Constructed Hollow Carbon Spheres and Their Favorable Electroactivity with Respect to Lithium Storage, Adv.. Mater 22 (2010), 838-842.

Inagaki, M., et al., Conditions for Carbon Spherule Formation Under Pressure, Carbon 22 (6), (1984), 617-619.

Ryu, J. et al., Hydrothermal Preparation of Carbon Microspheres From Mono-Saccharides and Phenolic Compounds, Carbon 48 (2010), 1990-1998.

Li, H. et al., Research on Advanced Materials for Li-Ion Batteries, Adv. Mater. 21 (2009), 4593-4607.

\* cited by examiner

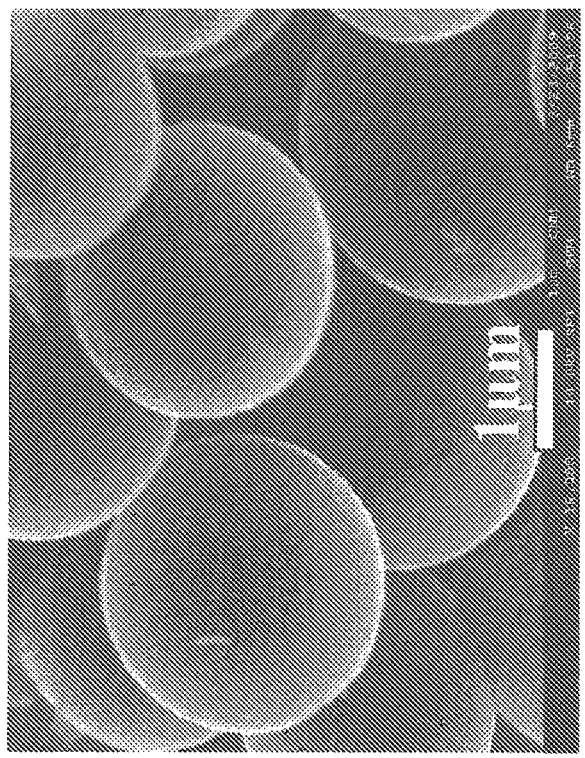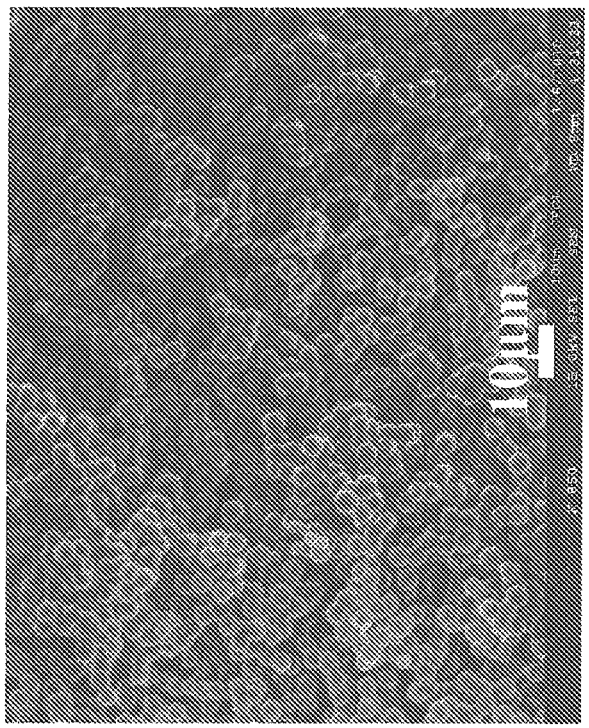
Figure 11

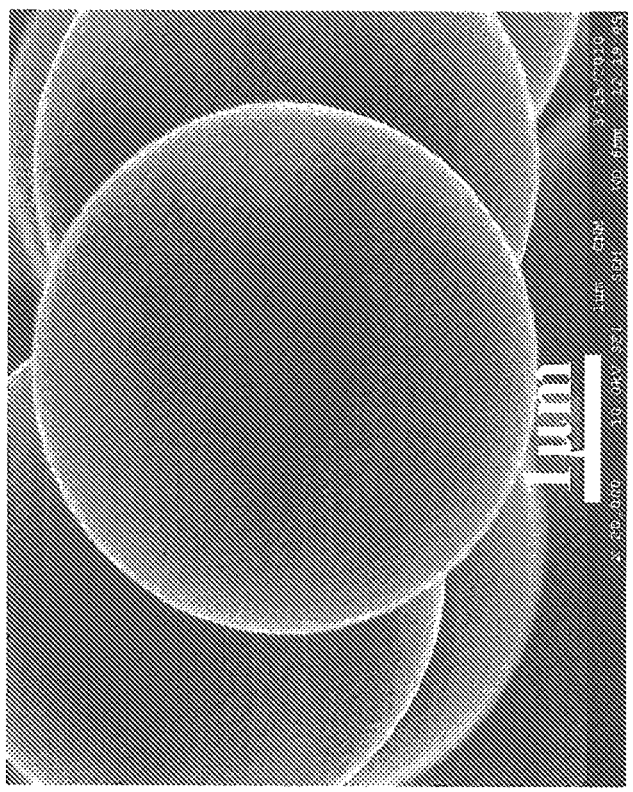
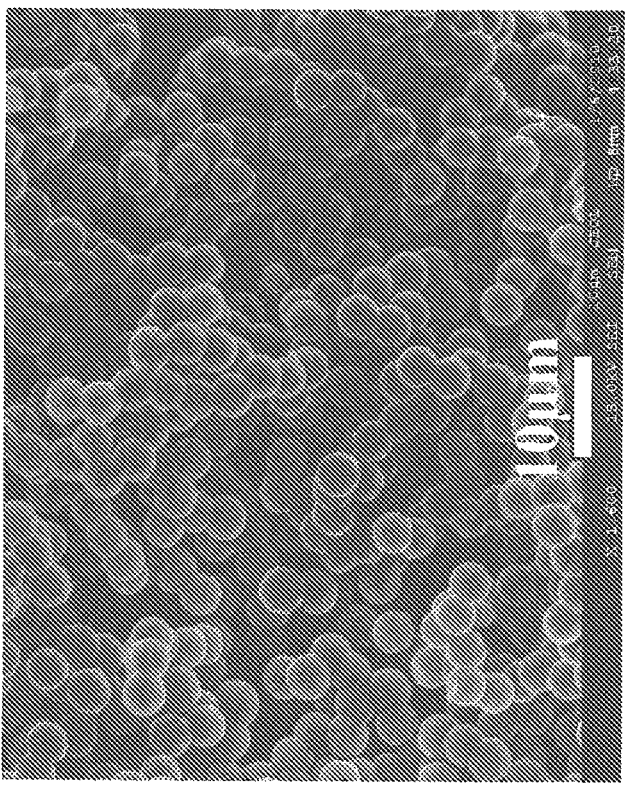
Figure 12

AUTOGENIC PRESSURE REACTIONS FOR BATTERY MATERIALS MANUFACTURE

CROSS-REFERENCE TO RELATED APPLICATIONS

This application claims the benefit of U.S. Provisional Application Ser. No. 61/360,027, filed on Jun. 30, 2010, and of U.S. Provisional Application Ser. No. 61/280,025, filed on Oct. 29, 2009, each of which is incorporated herein by reference in its entirety.

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to electrode materials for energy storage devices, notably electrochemical cells and batteries and, more particularly, non-aqueous lithium cells and batteries. Lithium cells and batteries are of particular use for powering a wide range of applications such as portable electronic devices (for example, cell phones and laptop computers), medical-, space-, aeronautic- and defense-related devices and in transportation applications, such as hybrid-electric- and all-electric vehicles.

SUMMARY OF THE INVENTION

This invention relates to electrode materials for energy storage devices, notably electrochemical cells and batteries and, more specifically, non-aqueous lithium cells and batteries. More specifically, in one aspect, the invention relates to electrode materials synthesized within an enclosed reaction chamber. The method of synthesis makes use of an autogenic pressure reactor in which one or more, dry, solvent-free chemical precursor powders are dissociated and reacted in the enclosed chamber at elevated temperature, thereby creating self-generated pressure within the chamber. The reactor is designed to operate typically up to a maximum working pressure of about 2000 pounds per square inch and a maximum temperature of about 800° C. Reaction parameters such as heating rate, temperature, time, reactant concentration, stoichiometry, pressure, and atmosphere (either oxidizing, reducing or inert) can be controlled to fabricate a wide range of electrode materials with various compositions, morphologies, particle shape and size, with either nano- or micron sized dimensions. The carbon-containing materials prepared according to the invention include both stoichiometric and defect materials with respect to their composition and their atomic, cationic or anionic sites.

Furthermore, the autogenic pressure reactor and method can produce, in situ, a variety of novel, unique 'core-shell' electrode materials. For example, the methods of this invention can produce core-shell materials with a metal, metal alloy, metalloid, metal oxide, metal phosphate or metal silicate core and an outer shell, coating or environment, for example, a carbon shell, coating or environment providing improved electronic and/or ionic conductivity on and between electrode particles. This can be particularly important when insulating anode and cathode products, such as $LiFePO_4$ and $TiO_2$, are fabricated. Spherical carbon particles, and rounded carbon particles with distorted shapes such as prolate or oblate shapes, carbon nanotubes or mixtures of shapes, that can be used either as an active anode material or as a current collector for either the anode or cathode, or both, can also be produced by autogenic reactions.

A particularly important embodiment of this invention is that these carbon materials are preferably heated after autogenic synthesis to elevated temperatures above 1000° C. in an inert atmosphere to improve their electrochemical properties. The electrode materials produced by the reactor have particular application in energy storage devices such as primary and secondary (rechargeable) batteries including, for example, lithium polymer batteries, lithium sulfur batteries and most notably lithium-ion batteries that are used for powering a broad range of devices, such as portable electronics (for example, cell phones and laptop computers), medical, space, aeronautical and defense-related devices, as well as hybrid-electric, plug-in hybrid-electric, and all-electric vehicles.

In one particular embodiment, the present invention provides a lithium or lithium-ion electrochemical cell comprising a cathode, an anode, and a non-aqueous lithium-containing electrolyte therebetween, wherein one or more of the anode and the cathode comprises at least one particulate carbon-containing material selected from the group consisting of: (a) a particulate metal oxide/carbon composite material, optionally in combination with Li ions, the metal oxide comprising one or more ions selected from the group consisting of Ti, Fe, Mn, Co, Ni, Mo, W, In, and Sn, (b) a particulate metal/carbon composite material comprising one or more metal that can alloy with Li selected from the group consisting of Mg, Al, Ga, In, Sn, and Sb, (c) a particulate metaloid/carbon composite material comprising one or more metaloid that can alloy with Li selected from the group consisting of B, Si and Ge, (d) a particulate metal phosphate/carbon composite material, optionally in combination with Li ions, wherein the metal phosphate comprises one or more ions selected from the group consisting of Ti, V, Mn, Ni, and Co, and (e) a particulate carbon material comprising rounded carbon particles that preferably, but not exclusively, are selected from the group consisting of carbon spheres, prolate-shaped spheroids, oblate-shaped spheroids, and carbon nanotubes. The particulate carbon-containing material is prepared by heating one or more precursor materials in a sealed autogenic pressure reactor at a temperature and for a period of time sufficient to dissociate the one or more precursor material into at least one gaseous component and thereby generate a pressure sufficient for components of the dissociated precursor material to combine and form the particulate carbon-containing material; wherein the combined amount and chemical composition of each precursor material in the reactor is sufficient to form the particulate carbon-containing material.

In another aspect, the present invention provides a method of fabricating rounded carbon particles suitable for use in an electrochemical cell. The method comprises heating one or more precursor materials in a sealed autogenic pressure reactor at a temperature and for a period of time sufficient to dissociate the one or more precursor material into at least one gaseous component and thereby generate a pressure sufficient for components of the dissociated precursor material to combine and form the particulate carbon-containing material. The combined amount and chemical composition of each precursor material in the reactor is selected so as to be sufficient to form the particulate carbon-containing material. The method further includes isolating the rounded carbon particles from the reactor, generally after cooling the reactor (e.g., to ambient room temperature), and subsequently annealing the isolated rounded particles under inert an inert atmosphere at a temperature in the range of about 1000 to about 3000° C.

(preferably about 2000 to about 3000° C., more preferably about 2400 to about 3000° C.). The rounded carbon particles preferably, but not exclusively, are selected from the group consisting of carbon spheres, prolate-shaped carbon spheroids, oblate-shaped carbon spheroids, carbon nanotubes, and a combination thereof. Rounded carbon particles prepared by this method are also encompassed by the present invention. Preferably, the rounded particles exhibit a Raman spectrum characterized by bands centered at about 1300 to 1350 cm$^{-1}$, at about 1550 to 1600 cm$^{-1}$ and at about 1600 to 1650 cm$^{-1}$.

In addition, the present invention provides a method for fabricating a carbon-coated particulate metal oxide, metal phosphate, metal, or metaloid material suitable for use in an electrode of an electrochemical cell. The method comprises heating one or more precursor material in a sealed autogenic pressure reactor at a temperature and for a period of time sufficient to dissociate the one or more precursor material into at least one gaseous component and thereby generate a pressure sufficient for components of the dissociated precursor material to combine and form the carbon-coated particulate material. Carbon-coated particulate metal oxide, metal phosphate, metal, and metaloid materials prepared by this method also form part of the present invention.

BRIEF DESCRIPTION OF THE DRAWINGS

The invention includes certain novel features and a combination of parts hereinafter fully described, illustrated in the accompanying drawings, and particularly pointed out in various aspects of the invention, it being understood that various changes in the details may be made without departing from the spirit, or sacrificing any of the advantages of the described invention.

FIG. 11 depicts, in (a) spherical carbon particles produced in an autogenic pressure reactor at two magnifications.

FIG. 12 depicts the spherical carbon particles of FIG. 11 after heating at 2400° C. in an inert atmosphere at two magnifications.

DETAILED DESCRIPTION OF THE PREFERRED EMBODIMENTS

Figure 1:
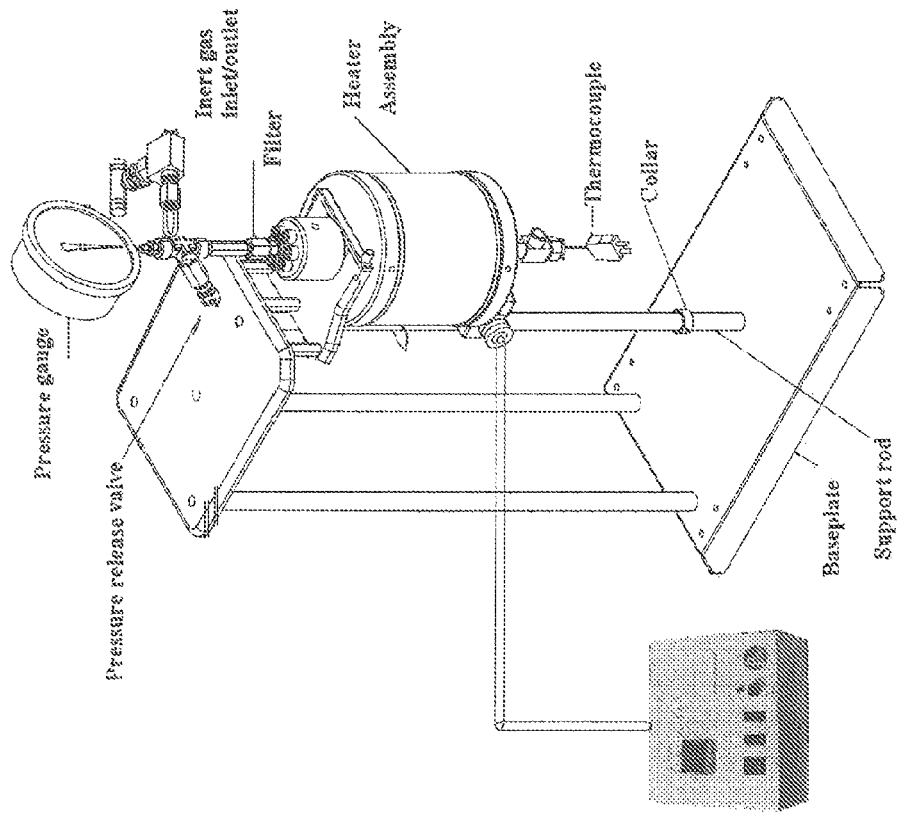
FIG. 1 depicts a schematic representation of an autogenic pressure reactor.

This invention relates to novel electrode materials for lithium electrochemical cells, to novel methods of preparing the electrode materials for electrochemical energy storage devices, such as electrochemical cells, batteries, supercapacitors and fuel cells incorporating such materials. The methods have particular application in the fabrication of electrode materials for lithium batteries, more specifically rechargeable lithium-ion batteries. Over recent years, in addition to the efforts that have been made to improve, for example, the dectrochemical performance of micron-sized particles by tailoring the morphological properties of primary and secondary particles. There has also been increased interest in fabricating electrode particles that are stable at the nano-sized level, such as lithium-iron-phosphate LiFePO$_4$ (olivine) cathodes and lithium titanate Li$_4$Ti$_5$O$_{12}$ (spinel) anodes, see for example, J.-M. Tarascon and M. Armand. Nature, volume 414, page 359 (2003). Such materials can be beneficial to improving the capacity, energy and power of lithium batteries rate and cycle life.

Several techniques have been developed over the years to fabricate nanomaterials for battery electrodes, for example, those involving hydrolysis, oxidation, solid-state, solvothermal, chemical-vapor-deposition, sonochemical, microwave irradiation, aerosol spray pyrolysis, inert gas condensation, high-energy ball milling, thermolysis, plasma synthesis, electrodeposition, and sol-gel reactions. These processes can be used to synthesize nanomaterials to varying degrees of commercially-viable quantities. Additionally, nanomaterials can be coated to increase the thermal, mechanical and/or chemical stability of materials, increase their durability and lifetime, decrease friction, inhibit corrosion, prevent aggregation, thereby modifying their overall physicochemical properties.

Considering the advantages and disadvantages of the known methods and the requirement of today's nanotechnology, a facile synthetic approach using an autogenic process reactor to prepare new electrode materials for energy storage applications has been developed. An autogenic pressure reactor system was first described by Pol et al., for example, in Chemistry of Materials, Volume 16, page 1793 (2004) for the stabilization of $ZrO_2$ nanoparticles for their possible application as a catalyst or a catalyst support for various gas-phase reactions. The method makes use of a reactor in which one or more chemical precursors (either solid or liquid) are dissociated without addition of solvents and reacted in an enclosed chamber at elevated temperature, thereby creating self-generated pressure within the chamber. Reaction parameters such as heating rate, temperature, time, reactant concentration, stoichiometry, pressure, and atmosphere (either oxidizing, reducing or inert) can be controlled to fabricate a wide range of materials with various morphologies, particle shape and size, with either nano- or micron sized dimensions.

Odoni et al. used an autogenic pressure reactor for making a precursor of carbon-coated $V_2O_5$ electrode particles for lithium cells, as disclosed in Advanced Materials, Volume 18, page 1431 (2006). For this reported experiment, a vanadium triethylate $VO(OC_2H_5)_3$ precursor and a small scale, 2-5 cm$^3$ volume stainless steel reactor was used. This experiment, however, had several limitations: (1) instead of forming the desired carbon-coated $V_2O_5$ product, a reduced carbon-coated $V_2O_3$ product was formed; (2) an oxidation step was required to convert the $V_2O_3$ product to $V_2O_5$ at 300° C. or higher in air; and 3) the reactors were limited to an upper maximum reaction temperature of 700° C. and by an inability to accurately control the reaction atmosphere and pressure to ensure safety against possible venting and explosion.

The inventors have subsequently discovered that autogenic reactions can produce, in situ, a variety of unique 'core-shell' materials, for example, those with a metal, metal alloy, metalloid, metal oxide, metal phosphate or metal silicate core and an outer shell, coating or environment, for example, a carbon shell, coating or environment providing improved electronic and/or ionic conductivity on and between electrode particles, which can be particularly important when insulating anode and cathode products, such as $TiO_2$ and $LiFePO_4$, are fabricated. If, however, the outer shell of the core electrode acts as an electronic insulator and conducts $Li^+$ ions, then the shell can act advantageously as a solid electrolyte layer to protect the electrochemically active electrode core from undesired reactions at the particle surface. It has also been discovered that a wide range of novel products with unique morphologies can be produced by autogenic reactions and that the formation of a desired product is highly dependent on the identification and selection of the precursor materials. In particular, it has been discovered that this technique can be used selectively and effectively to prepare some electrode materials for lithium batteries directly within the reaction chamber with insignificant or no side reaction products. A particularly significant discovery is that carbon spheres, carbon nanotubes and other rounded carbon shapes, such as prolate shapes, can be prepared by autogenic reactions and that improved electrochemical performance of the carbon electrodes with respect to their reactivity with lithium can be obtained by heating the carbon products of autogenic reactions to elevated temperatures, for example above 1000° C., and preferably above 2000° C., without destroying the overall morphology of the carbon. The products of autogenic reactions are highly dependent on the identification and selection of the precursors and the reactions conditions under which the products are synthesized.

The materials produced by the autogenic reactor have particular application in primary and secondary (rechargeable) batteries, including, for example, lithium polymer batteries, lithium sulfur batteries and, most notably, lithium-ion batteries that are used for powering a broad range of devices, such as portable electronics (cell phones and laptop computers), medical, space, aeronautical and defense-related devices, as well as hybrid-electric, plug-in hybrid-electric, and all-electric vehicles.

In one embodiment of the present invention, a lithium- or lithium-ion electrochemical cell comprises a cathode, an anode, and a non-aqueous lithium-containing electrolyte therebetween wherein one or more of the anode and the cathode comprises at least one particulate carbon-containing material selected from the group consisting of one or more carbon-containing metal oxide particles, the metal oxides comprising one or more ions of Ti, Fe, Mn, Co, Ni, Mo, W, In, and Sn optionally with Li ions, carbon-containing metal particles comprising one or more of Mg, Al, Ga, In, and Sn that alloy with Li, carbon-containing metalloid particles comprising one or more of B, Si, Ge and Sb that alloy with Li, or carbon-containing metal phosphate particles, the metal phosphates comprising one or more ions of Ti, V, Mn, Ni, and Co, optionally with Li ions, or rounded carbon particles including, but not limited to, carbon spheres, prolate-shaped spheroids, oblate-shaped spheroids, and carbon nanotubes. The invention includes carbon-containing materials that are stoichiometric, defect or disordered with respect to their composition and atomic, cationic or anionic sites. In a preferred embodiment, the particulate carbon-containing material is prepared by reacting one or more solid or liquid, solvent-free chemical precursor materials comprising the elements making up the material in an enclosed autogenic pressure reactor in which the precursor materials are dissociated and reacted at elevated temperature, thereby creating self-generated pressure within the reactor. Preferably, the reactor operates under conditions ranging from a minimum working pressure of about 100 pounds per square inch and a minimum temperature of about 100° C., to a maximum working pressure in the range of about 800 to about 2000 pounds per square inch, typically about 400 to about 1000 pounds per square inch, and a maximum temperature in the range of about 300 to about 800° C., typically about 500 to about 800° C.

In a preferred embodiment, the particulate carbon-containing material is a carbon-coated metal oxide or metal phosphate nanoparticulate material comprising particles having a titanium oxide core, a tin oxide core, or a lithium-metal-phosphate core such as an olivine-type core or a Nasicon-type core, which are coated with about 0.5 to about 30 percent by weight of carbon, the particles having a size in the range of about 5 to about 150 nm. The metal of the metal oxide or metal phosphate comprises one or more metals selected preferably from the group consisting of V, Ti, Fe, Mn, Ni, and Co. The carbon-coated metal oxide or metal phosphate nanoparticle materials are prepared via an autogenic pressure reaction, as described above.

In one preferred embodiment, the carbon-coated metal oxide nanoparticle material comprises, for example, titanium dioxide core particles coated with about 0.5 to about 30 percent by weight of carbon. The nanoparticle material has a size in the range of about 5 to about 150 nm, and the titanium dioxide core particles are predominately single phase anatase $TiO_2$. The titanium dioxide material can be prepared by reacting one or more solid, solvent-free titanium carboxylate precursor materials (e.g., titanium (IV) oxyacetyl acetonate) in an autogenic pressure reaction, as described herein. Optionally, the product of the autogenic pressure reaction can be heated in air to reduce the amount of carbon coating the product. Other titanium oxide materials, such as those with a rutile-type structure, $TiO_2$—B structure and amorphous titanium oxide are known in the art. All such $TiO_2$ materials are useful as anode materials in lithium electrochemical cells, particularly if fabricated with nano dimensions, typically, but not exclusively, less than 100 nm.

In another preferred embodiment, the particulate carbon-containing material comprises $MoO_2$ nanoparticles coated with carbon, or alternatively, when heated in air, to convert the molybdenum oxide core to $MoO_3$, while maintaining a residual shell of carbon around the oxidized core.

In another preferred embodiment, the carbon-coated metal oxide particle material comprises metal oxide core nanoparticles, such as tin dioxide particles having a size in the range of about 5 to about 100 nm, coated with about 1 to about 4 nm of carbon. The tin dioxide core particles are predominately cassiterite-type $SnO_2$. The tin dioxide material can be prepared by reacting one or more solid, solvent-free tin alkoxide precursor materials (e.g., tin (II) ethoxide) in an autogenic pressure reaction as described herein. Optionally, the product obtained from the autogenic pressure reaction can be heated in air to reduce the amount of carbon coating the product or it can be heated in a reducing atmosphere such as nitrogen or dilute hydrogen to reduce the tin dioxide, such that carbon coated $SnO_{2-x}$ ($0<x\leq2$) materials, including defect tin oxide materials and metallic Sn are formed. Such materials are useful as anode materials in electrochemical cells.

In yet another preferred embodiment, the particulate carbon-containing material comprises a carbon-coated metal phosphate nanoparticulate material comprising core particles, for example, having an olivine-type structure or a Nasicon-type structure coated with about 0.5 to about 30 percent by weight of carbon, the nanoparticulate material having a particle size in the range of about 5 to about 150 nm, and wherein metal ions in the olivine or Nasicon-type structure comprises one or more metals selected preferably from the group consisting of V, Ti, Fe, Mn, Ni and Co. Such phosphate materials are useful as cathode materials as well as solid electrolyte materials, for example, on the surface of metal oxide cathode particles in electrochemical cells.

The carbon-coated metal phosphate nanoparticulate materials can be prepared by reacting one or more solid, solvent-free precursor materials in an autogenic pressure reaction as described herein. The precursor materials include one or more compounds comprising carbon, phosphate, Li, and a metal selected preferably from V, Ti, Fe, Mn, Ni or Co. Optionally the carbon-coated olivine product obtained from the autogenic pressure reaction can be heated in air to reduce the amount of carbon coating the product. Examples of suitable precursor materials for fabricating $LiMPO_4$ olivine-type materials include one, or a combination, of a Fe, Mn, Ni or Co carboxylate and a lithium phosphate salt or one, or a combination, of a Fe, Mn, Ni or Co phosphate and a lithium carbonate salt.

In another preferred embodiment, the particulate carbon-containing material comprises carbon microspheres comprising generally spherical carbon particles. The size of the spherical carbon particles can vary, for example, in the range of about 1 to about 5 microns in diameter, when made by selected reactor conditions of temperature and pressure as described hereafter. The carbon microspheres can be prepared, for example, by reacting a solvent-free polyethylene terephthalate polymer in an autogenic pressure reaction as described herein. Other precursor materials, such as mesityline and other polymers, are possible and can be used instead of the polyethylene terephthalate polymer to produce the carbon spheres. Preferably, the carbon microspheres can contain a combination of disordered carbon and graphitic carbon. The ratio of disordered carbon to graphitic carbon can be greater than 1, for example, in the range of about 1 to about 1.1, or it can be less than 1 (e.g., if the microspheres subsequently are heated in under inert conditions, for example under vacuum or under an inert gas, such as He or Ar, at a temperature of about 1000 to about 3000° C. to increase the graphitic character within the spheres), which can be advantageous for stability, capacity and rate reasons. The invention extends to include carbon products, made by autogenic reactions, with other rounded shapes, such as prolate shapes, oblate shapes and the like, and particularly to heated products that have been discovered to exhibit remarkable morphological stability not only when subjected to high temperature but also to their reaction with lithium, unlike the as-prepared rounded carbon particles that are not subjected to a subsequent heat treatment process.

In other preferred embodiments, the carbon-containing material comprises carbon nanotubes; these nanotubes can be prepared, for example, by reacting solvent-free precursor materials comprising low density polyethylene and a cobalt carboxylate compound, the latter compound forming a cobalt catalyst during the autogenic pressure reaction as described herein. The carbon nanotubes can optionally include nanoparticles of other electrochemically active anode materials, for example, titanium dioxide, silicon, tin or a combination thereof on the surface of the nanotubes or in close contact with the nanotubes. The invention extends to include heat-treated nanotubes that are subjected in a second step to higher temperatures of about 1000 to about 3000° C. under inert conditions, for example, under vacuum or under an inert gas, such as He or Ar, as described hereinbefore for the rounded carbon products.

The present invention also provides a battery comprising a plurality of electrochemical cells as described herein arranged in parallel, in series, or both.

In yet a further embodiment, the invention relates to a scaled-up reactor design, particularly for laboratory research, with a volumetric capacity of 20 ml or more, preferably 40 ml or more, that can operate at a minimum working pressure of about 100 pounds per square inch and a minimum temperature of about 100° C., and a maximum working pressure of about 2000 pounds per square inch and a maximum temperature of about 800° C. to produce the electrode and electrolyte materials of this invention. It stands to reason that higher volumetric capacities will be required for pilot plant- or industrial-scale production. Preferably the reactor is capable of operating at a minimum working pressure of about 100 pounds per square inch and a minimum temperature of about 100° C., and a maximum working pressure of about 1200 pounds per square inch and a maximum temperature of about 600° C. Most preferably the reactor is capable of operating at a minimum working pressure of about 100 pounds per square inch and a minimum temperature of about 100° C. and a maximum working pressure of about 800 pounds per square inch and a maximum temperature of about 300° C. The design of the autogenic process reactor consists of a suitable reaction vessel, such as a Haynes 230 alloy reactor, a heating furnace with programmable temperature control, an ability to purge desired gases, and a supporting stand assembly as shown in FIG. 1. The volume of the reactor can be tailored according to the desired amount of material required. For example, when producing 5-10 g of materials, a 35 ml reactor is typically used. The invention relates further to a non-aqueous; template-, surfactant-, and solvent-free method for the production of electrode products that do not require a significant change to their redox states through further oxidation or reduction reactions and to solid electrolyte products, notably lithium-ion conducting electrolytes, preferably, but not exclusively, for use as a protective shell to circumvent undesired reactions between an electrochemically active core and the electrolyte, particularly at high states of charge or discharge of an electrochemical cell. In particular, the autogenic pressure reactions can produce, in situ, metal, metal alloy, metalloid, metal oxide, metal phosphate or metal silicate electrode particles optionally with an outer shell, coating or environment, for example, a carbon or solid electrolyte shell or coating to improve the electronic and/or ionic conductivity of electrode particles and the electrical connectivity between them. The method may involve one or more solid or liquid precursors and preferably only one step to produce the electrode and electrolyte materials of the desired composition and morphology.

Synthesis of Battery Electrode Materials

The syntheses of battery electrode and electrolyte materials are carried out with the autogenic reactor typically as follows. Appropriate amounts of the chemical precursors, preferably comprised of one or more organic or organometallic precursor materials, optionally in combination with other decomposable inorganic precursor materials that will define the stoichiometry of the final product are placed in a ceramic tube, which is then introduced into the reaction vessel. The reactor is sealed using a high temperature graphite gasket, and thereafter heated at a rate of about 1-80° C. per minute, preferably about 10-40° C. per minute to the desired temperature (about 100-800° C.). The reaction vessel is then held at elevated temperature depending upon the reaction requirements that typically range from about 1 minute to about 3 hours, or longer if required. Chemical dissociation and transformation reactions take place under the autogenic pressure of the precursor to yield one or more reaction products, such as a metal, a metal alloy or intermetallic compound, a metalloid, a metal oxide, a metal phosphate, a metal silicate, mixed metal variations thereof, and carbon. For example, the metal, intermetallic and metalloid products can be Sn, $Cu_6Sn_5$ and Si, whereas metal oxide products can be transition metal oxides, selected preferably from Ti, Fe, Mn, Ni, and Co and optionally with Li, such as $TiO_2$ and $Li_4Ti_5O_{12}$, or oxides of the main group metal elements, such as $SnO_2$. The products can therefore be lithium-containing metal oxides such as those having layered and spinel structures as known in the art. The carbon products can be comprised of amorphous carbon, hard carbon, graphitic carbon, carbon nanotubes and combinations thereof, particularly those with rounded morphologies and shapes, such as spherical carbon particles, or those with prolate or oblate shapes. In a particular embodiment, the invention relates to an autogenic method of fabricating rounded carbon particles for an electrochemical cell, comprising carbon spheres, prolate-shaped spheroids, oblate-shaped spheroids, and carbon nanotubes or modifications thereof that includes heating the product of the autogenic reaction under inert conditions to a temperature between 1000 to 3000° C. The metal phosphates can be lithium metal phosphates, such as $LiFePO_4$ and those with a Nasicon-type structure; likewise, the metal silicates include the family of known lithium metal silicate compositions and structures.

The vessel is then cooled to room temperature. During the autogenic reaction, the organic components of the precursors decompose to generate gases such as CO, $H_2O$ and hydrocarbons, and further reduction can take place that can result in carbon coatings on the electrode particles or carbon products. The pressure can be released during the autogenic reaction, and the reaction atmosphere controlled to control the composition of the final product. For example, during the above-mentioned thermal dissociation reaction, the pressure in the closed reaction vessel can increase up to 1000 psi or more. To monitor and control the autogenic pressure, the reactor is equipped with safety protection devices such as pressure gauges, dual thermocouples, and a gas release capability. When cooling to room temperature, the pressure in the reactor decreases close to atmospheric pressure; the remaining pressure is carefully released using the gas release valve prior to opening. During operation, and during opening, the reactor is positioned behind a blast shield for safety.

In a further embodiment, autogenic reactions can be used to prepare electronically conducting coatings or layers, or ionically conducting coatings or layers, or both ionic and electronic coatings or layers on pre-existing core materials within an autogenic reactor. For example, carbon-containing materials can be fabricated by autogenic reactions on lithium metal oxide cathode core materials within an autogenic reactor to provide enhanced electronic conductivity and to protect the lithium metal oxide electrodes from undesired side reactions during charge or discharge at high potentials, for example >4.2 V vs. metallic lithium. Alternatively, ionically-conducting coatings or layers of non-carbon-containing materials, such as coatings or layers comprising lithium metal aluminates, lithium metal silicates, lithium metal phosphates, lithium metal zirconates and the like, can be deposited on the surface of pre-existing core materials within an autogenic reactor to provide enhanced ionic conductivity and to protect the electrodes from undesired side reactions from during charge or discharge at high or low potentials vs. metallic lithium.

The following examples describe the principles of the invention as contemplated by the inventors, but they are not to be construed as limiting examples. The examples demonstrate, in particular, the versatility of autogenic reactions in synthesizing materials with a diverse range of particle morphologies, conducive to their use as electrodes and/or current collecting media for lithium battery applications.

EXAMPLE 1

Carbon-Coated $TiO_2$ (Anatase)

Figure 2:
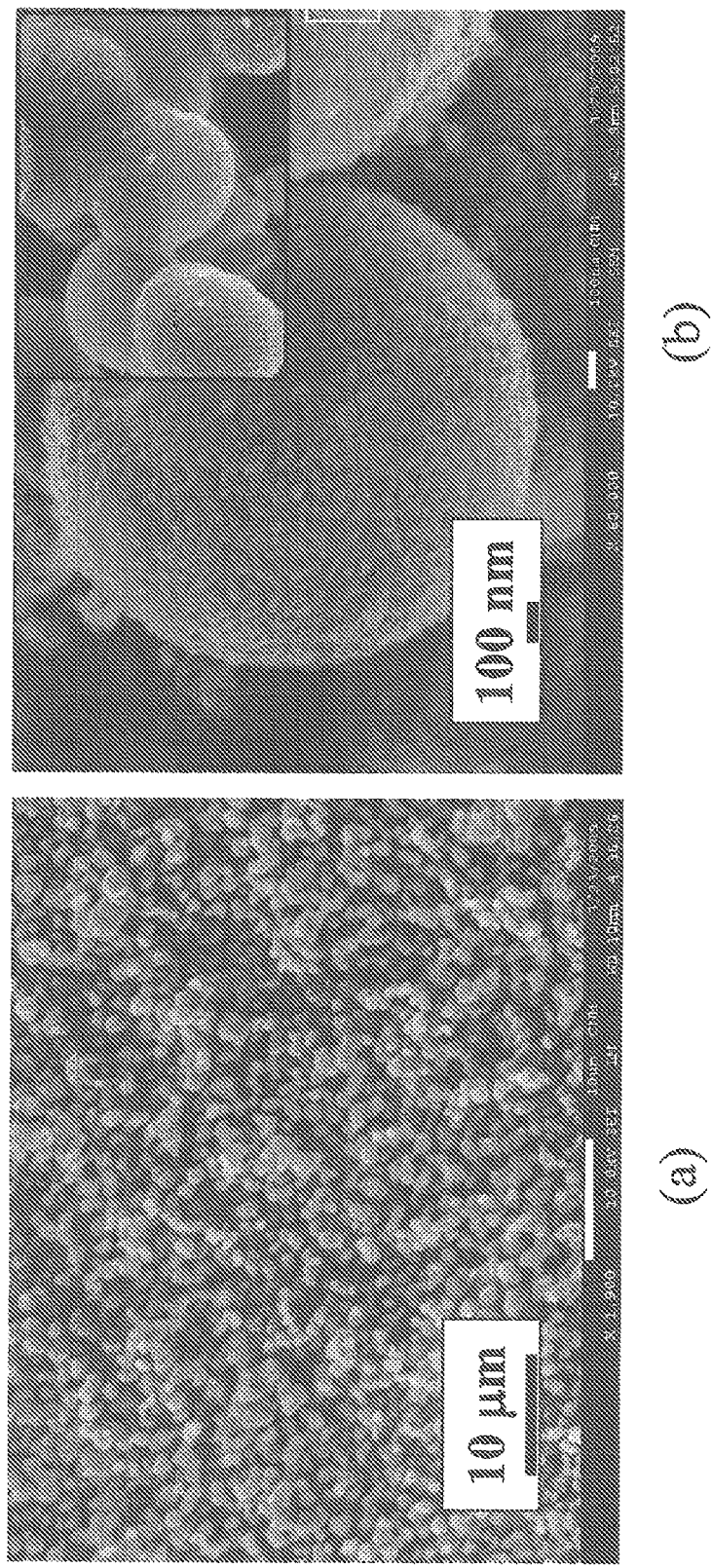
FIG. 2 depicts, in (a) and (b), the particle size and morphological features at two different magnifications of $TiO_2$ (anatase) electrode particles prepared in an autogenic pressure reactor.
Figure 3:
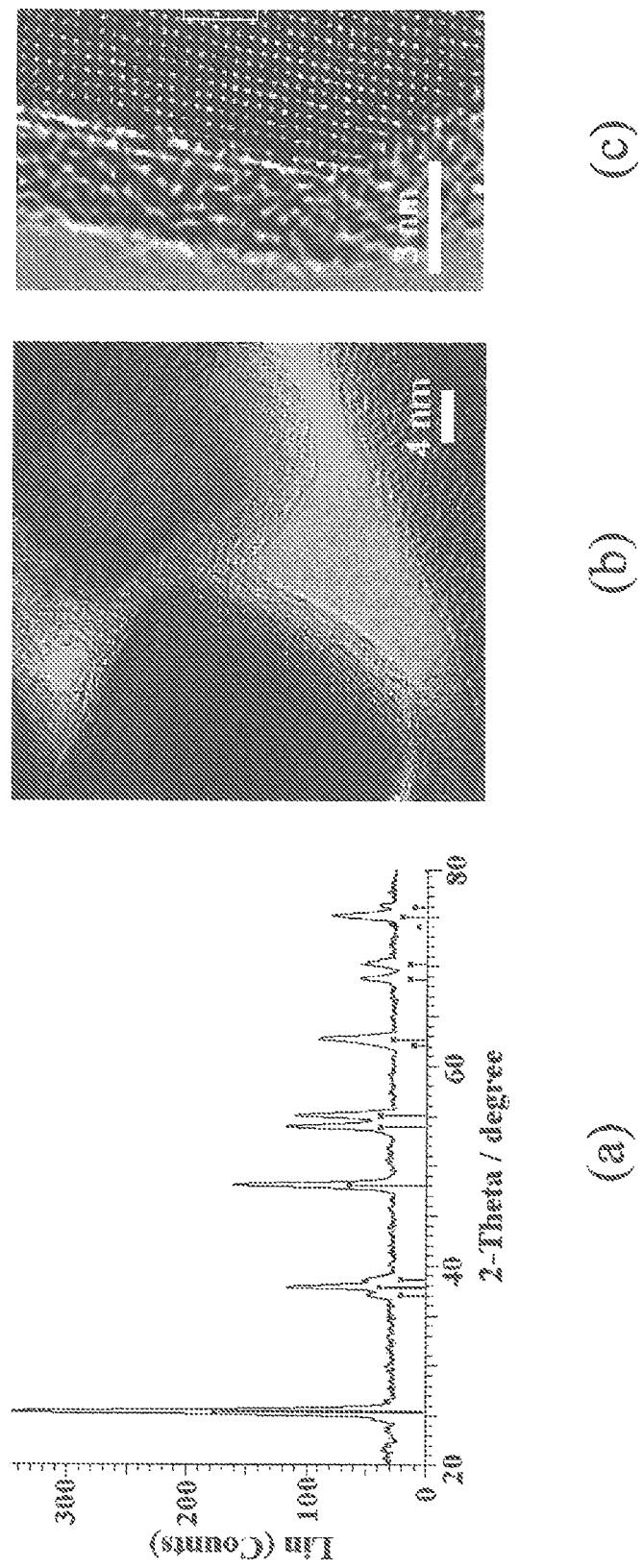
FIG. 3 depicts (a) the powder X-ray diffraction pattern of a $TiO_2$ (anatase) product of FIG. 2, and (b), (c) high resolution transmission electron micrographs of the $TiO_2$ particles coated with a carbon shell about 3 nm thick.

Carbon-coated $TiO_2$ was directly prepared from a single solid precursor, titanium (IV) oxyacetyl acetonate, TiO$[C_5H_8O_2]_2$. The precursor was introduced into the closed autogenic pressure reactor in an inert nitrogen atmosphere and heated at about 30° C./minute to about 700° C. for about 1 hour. The furnace was then turned off and the reactor was cooled for about 3 hours. Scanning-electron-microscope (SEM) images (FIG. 2, panels (a) and (b)) showed that the carbon-coated $TiO_2$ secondary particles, approximately 100 nm in diameter and sometimes connected together (inset in FIG. 2, panel b), had spherical morphology with primary $TiO_2$ particles less than 20 nm in dimension. The X-ray diffraction pattern of the product in FIG. 3, panel (a) showed that the $TiO_2$ material was essentially single-phase anatase. The precise nature of the carbon-coating was determined employing high resolution transmission electron microscopy, which confirmed that the nano-$TiO_2$ particles were individually coated with approximately 3 nm carbon layers (FIG. 3, panels (b) and (c)). Energy dispersive X-ray analysis, elemental dot mapping, and line scan mapping confirmed the presence of Ti, O and a small amount of carbon. The interconnectedness between the carbon coated $TiO_2$ particles made in accordance with the method of this invention is a most attractive advantage, because it ensures good electronic conductivity between the electrode particles during repeated charge and discharge (cell cycling).

Carbon analysis revealed that the as-prepared $TiO_2$ product contained about 30% carbon by weight. The product was further heated in air at about 450° C. for about 1 hour to reduce the amount the carbon, leaving a thin layer of carbon around the $TiO_2$ nanoparticles. A thermogravimetric analysis (TGA) of the heated product showed that approximately 5% by weight of carbon remained in the sample. Thus the amount of carbon in such coated electrodes can be tailored to ensure optimum electrode loading and electrochemical performance.

Figure 4:
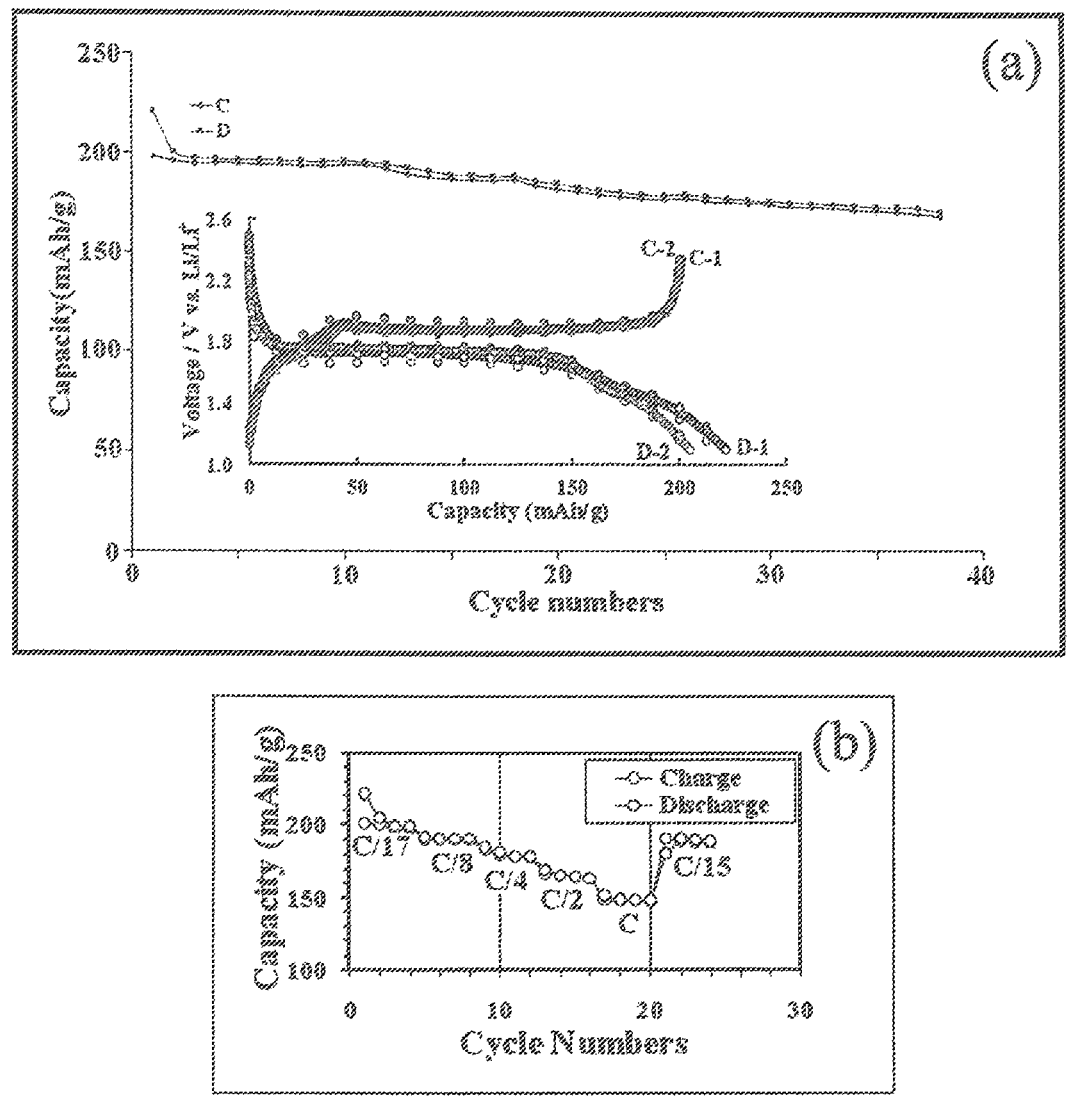
FIG. 4 depicts (a) the electrochemical charge-discharge profiles of a Li/$TiO_2$ cell containing the $TiO_2$ electrode particles of FIG. 2, and the $TiO_2$ electrode capacity vs. cycle number plot of the cell, and (b) a $TiO_2$ electrode capacity vs. cycle number plot of a Li/$TiO_2$ cell as a function of current rate.

Electrochemical evaluations were carried out in coin cells using a lithium metal foil electrode, the carbon-coated $TiO_2$ electrode under investigation, and an electrolyte consisting of 1.2M $LiPF_6$ in a 3:7 mixture of ethylene carbonate (EC) and ethylmethyl carbonate (EMC) (Tomiyama). The working electrode consisted of about 85 wt % of carbon-coated-$TiO_2$ powder, about 8 wt % carbon, and about 7 wt % polyvinylidene difluoride (PVDF) binder on carbon-coated aluminum foil. For the cycling experiments, cells were galvanostatically charged and discharged over a range of about 1.1 to about 2.35 V at about 0.1 mA/cm$^2$ (a C/17 rate). The electrochemical charge/discharge profiles and capacity vs. cycle number plot of a Li/carbon-coated $TiO_2$ cell, highlight the reversibility of the carbon-coated $TiO_2$ electrode, are shown in FIG. 4, panel (a), thereby demonstrating the utility of the electrodes when made according to the method of this invention. Surprisingly, the average capacity of the carbon-coated $TiO_2$ electrode delivered during the early cycles (about 190-200 mAh/g) exceeds the theoretical value of the lithium titanate spinel electrode, $Li_4Ti_5O_{12}$ (about 175 mAh/g), which is currently being exploited as the anode in commercial lithium-ion cell products. FIG. 4, panel (b) shows the charge-discharge curves and cycling performance of the Li/carbon-coated $TiO_2$ cell at various current rates (C/17 to C/1). The data in FIG. 4, panel (b) correspond to the change in discharge/charge current density that was varied from about 0.08 to about 1.2 mA cm$^{-2}$.

In addition to electronically-conductive carbon coatings, this invention can be extended to include ionically-conducting solid electrolyte coatings, such as Li$^+$-ion conducting solid electrolyte coatings on electrode particles and may be comprised, for example, of one or more inorganic materials selected from the family of lithium metal oxides, lithium metal phosphates, lithium metal silicates and the like. The invention therefore includes electrode materials that contain an outer shell or coating comprised of conductive carbon layer or a lithium-ion conducting solid electrolyte layer, or a combination of both.

EXAMPLE 2

Carbon-coated $MoO_2$ and $MoO_3$

Figure 5:
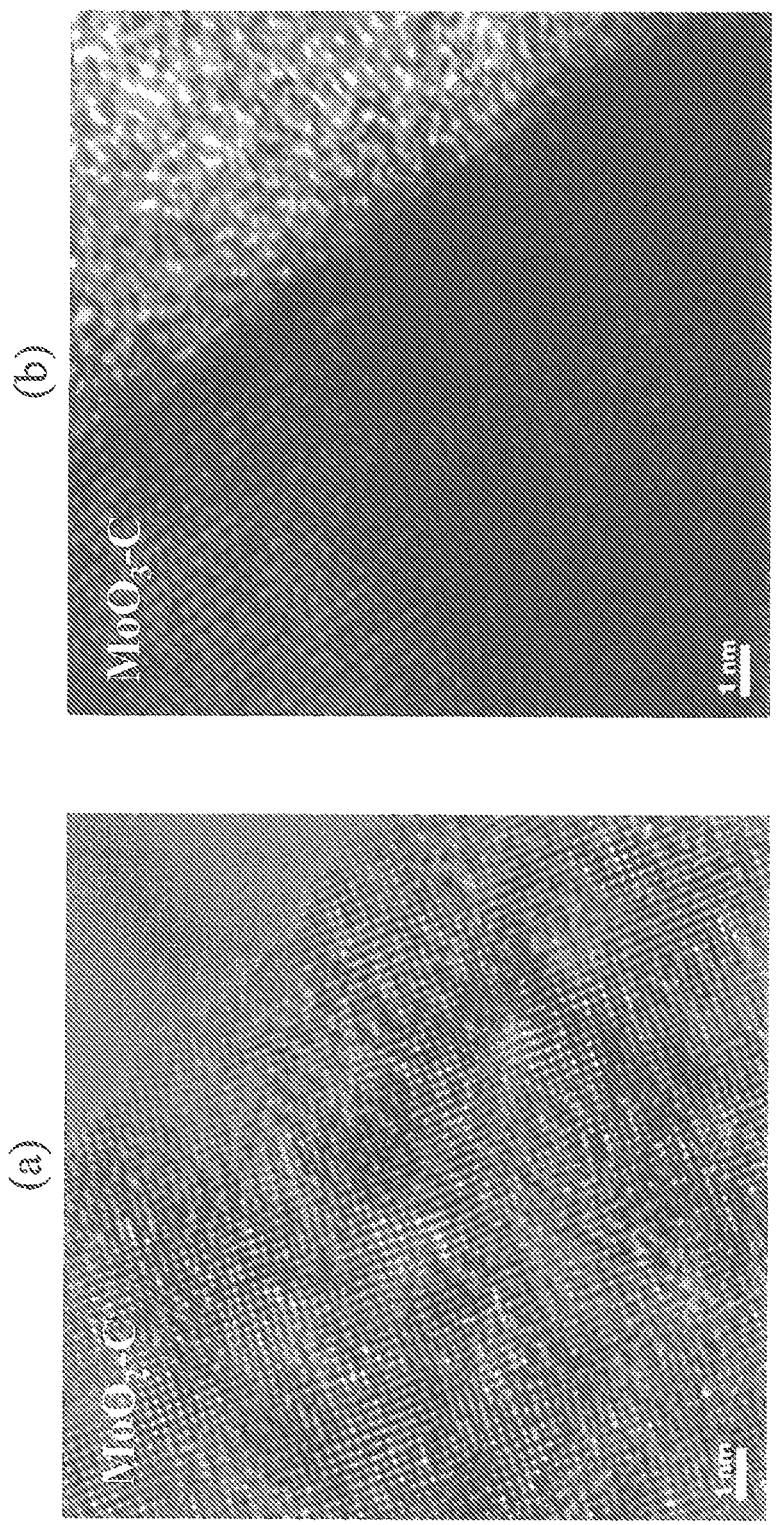
FIG. 5 depicts (a) a high resolution transmission electron micrograph of carbon-coated $MoO_2$ particles (b) a high resolution transmission electron micrograph of $MoO_3$ particles coated with carbon.

Carbon-coated $MoO_2$ nanoparticles coated were prepared by the autogenic reaction of a single precursor, bis(acetylacetonato)-dioxomolybdenum (VI), $(C_5H_8O_2)_2MoO_2$ at 700° C. X-ray diffraction and Raman spectroscopy measurements identified the product as highly pure, crystalline monoclinic form of $MoO_2$. The carbon coating was essentially amorphous to X-rays (confirmed by Raman spectroscopy), providing electronic conductivity to the core oxide electrode particles. The highly crystalline character of $MoO_2$ particles was clearly evident in the high-resolution image of the product as shown in FIG. 5 (a). These as-prepared $MoO_2$—C particles were heated to 300° C. in air for 30 minutes to convert the core material to $MoO_3$, while maintaining a small residual coating of carbon around the oxidized core (FIG. 5 (b)).

Figure 6:
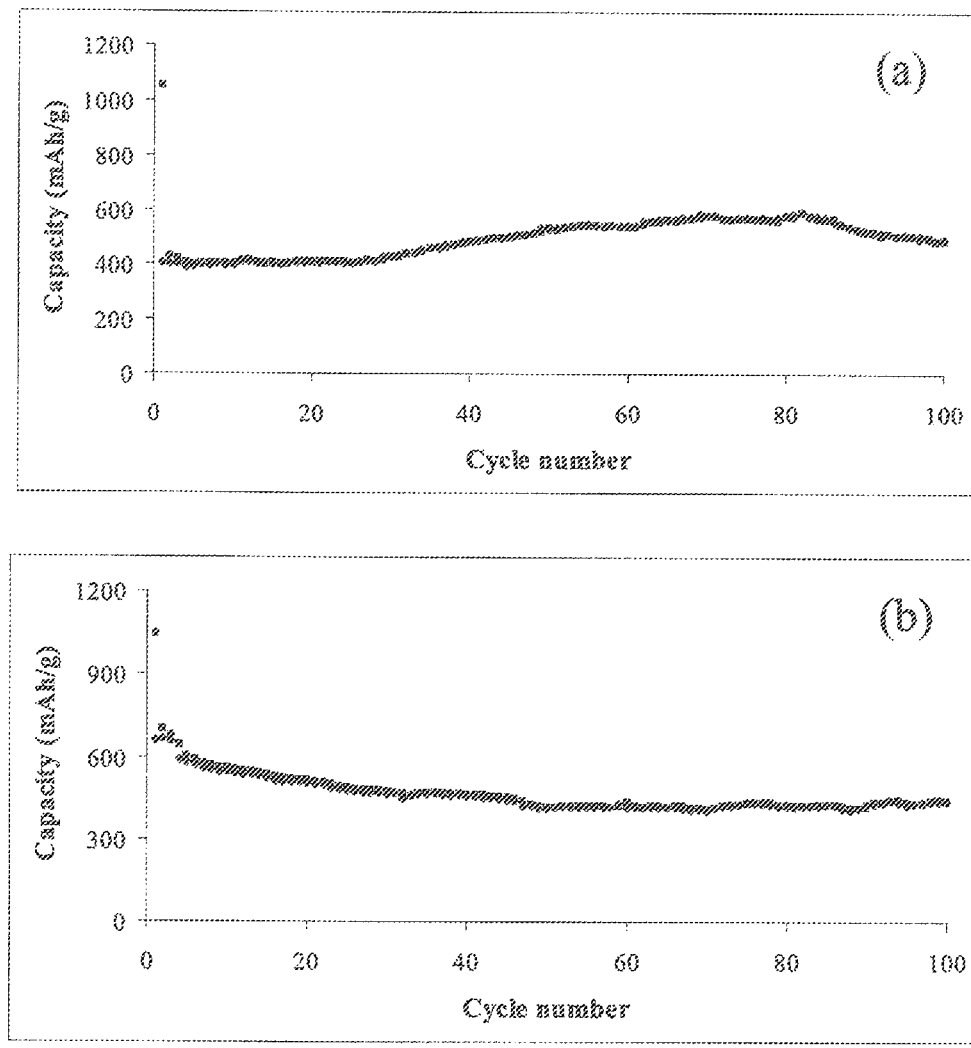
FIG. 6 depicts (a) a capacity vs. cycle number plot of a Li/$MoO_2$—C cell at a C/6 rate and (b) a capacity vs. cycle number plot of a Li/$MoO_3$—C cell at a C/6 rate.

The electrochemical properties of carbon coated $MoO_2$ and $MoO_3$ electrodes were determined in lithium half cells (coin-type, size 2032) using a lithium foil counter electrode. The $MoO_2$—C electrode was prepared by coating a slurry consisting of about 80 wt % $MoO_2$—C, 10% carbon black and about 10 wt % PVDF as binder on a copper foil. The $MoO_3$—C electrode was prepared in a similar fashion. Both electrodes were dried under vacuum for about 10 hours at about 80° C. The electrolyte was a 1.2 M solution of $LiPF_6$ in a 3:7 (by volume) solvent mixture of ethylene carbonate (EC) and ethylmethyl carbonate (EMC). The cells were assembled in a He-filled glove box. Cells were charged and discharged galvanostatically at room temperature at about 3.0 V to about 0.005 V at a C/6 rate. FIG. 6a shows a capacity vs. cycle number plot of a Li/$MoO_2$—C cell. After an initial irreversible capacity loss on the initial cycle, the data surprisingly showed a reversible capacity of more than 400 mAh/g for the Li/$MoO_2$—C electrode, even after 100 cycles. For the Li/$MoO_3$—C cell (FIG. 6b), after the initial cycle, the capacity is approximately 600 mAh/g. The capacity fades slowly on cycling, reaching a stable capacity of approximately 400 mAh/g, with a coulombic efficiency of greater than 99%.

EXAMPLE 3

Carbon-Coated $SnO_2$

Figure 7:
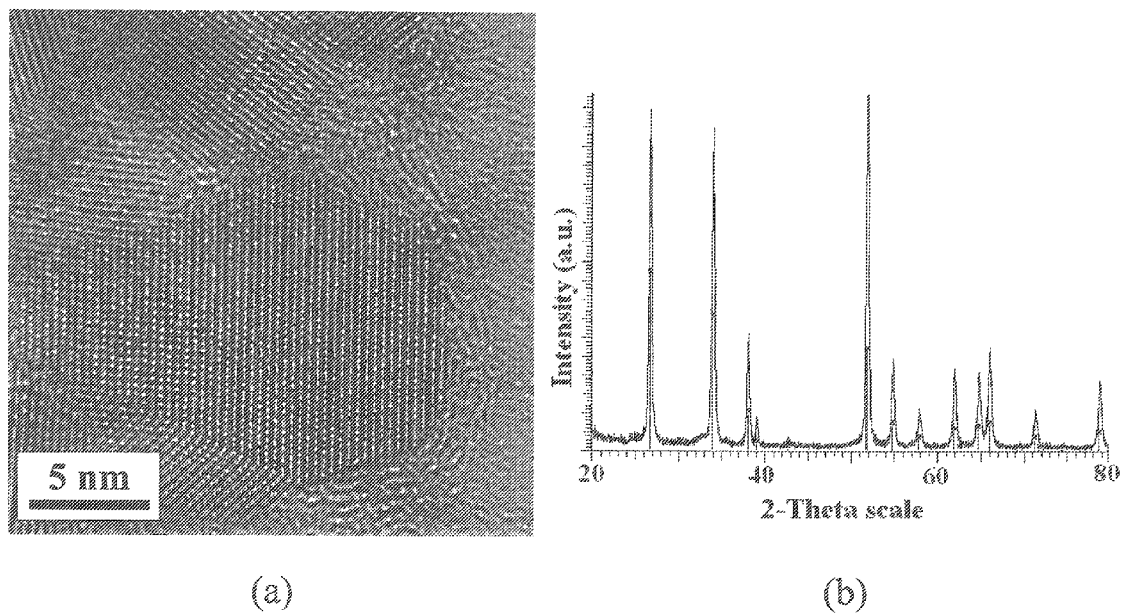
FIG. 7 depicts (a) a high-resolution TEM image of carbon-coated $SnO_2$ electrode particles produced in an autogenic pressure reactor, and (b) the powder X-ray diffraction pattern of the carbon-coated $SnO_2$ electrode particles.
Figure 8:
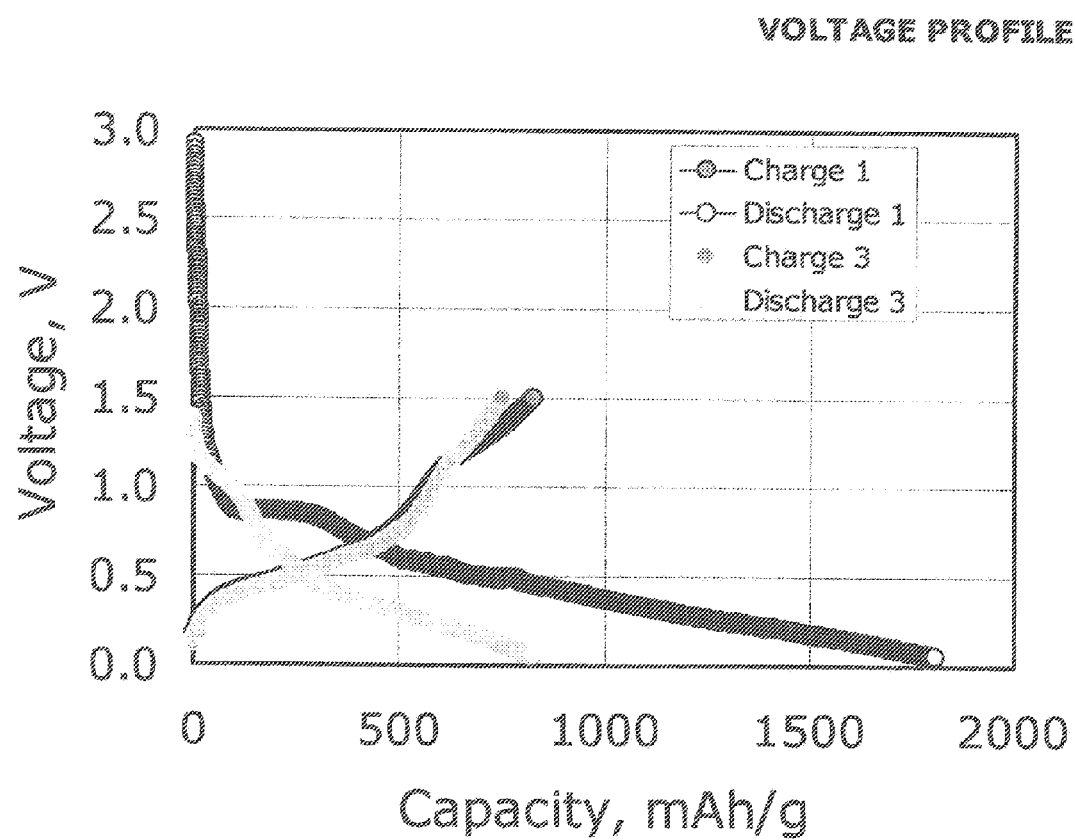
FIG. 8 depicts the electrochemical charge-discharge profiles of a Li/$SnO_2$ cell containing the carbon-coated $SnO_2$ electrode particles of FIG. 7.

A single $Sn(OC_2H_5)_2$ precursor, when dissociated in the closed autogenic pressure reactor at about 600° C. under air for about 3 hours yielded carbon-coated $SnO_2$ electrode particles. The primary $SnO_2$ particles representing the core were typically about 10-15 nm in dimension and surrounded by about 2-3 nm of semi-graphitic carbon (FIG. 7, panel (a)). The X-ray diffraction pattern of the $SnO_2$ component matched that of tetragonal, cassiterite-type $SnO_2$, as shown in FIG. 7, panel (b). Electrochemical evaluations were carried out in coin cells constructed as described for the carbon-coated $TiO_2$ electrodes of Example 1. Cells were galvanostatically charged and discharged over a range of about 1.5 to about 0.005 V at about 0.15 mA/cm$^2$. The first and third charge-discharge curves are shown in FIG. 8. After the initial break-in cycle, to allow for the formation of the passivating solid electrolyte interphase (SEI) layer, the carbon-coated $SnO_2$ electrode delivered a reversible capacity of approximately 750 mAh/g. This example, therefore, clearly demonstrates the utility of using autogenic reactions to prepare unique core-shell electrode materials in a single step from one precursor without the use of liquid solvents. Carbon-coated $SnO_2$ materials, like the carbon-coated $TiO_2$ of Example 1, are of particular interest as anodes for lithium cells and batteries.

EXAMPLE 4

Olivine $LiMPO_4$ (M=Fe, Mn, Ni, Co)

Figure 9:
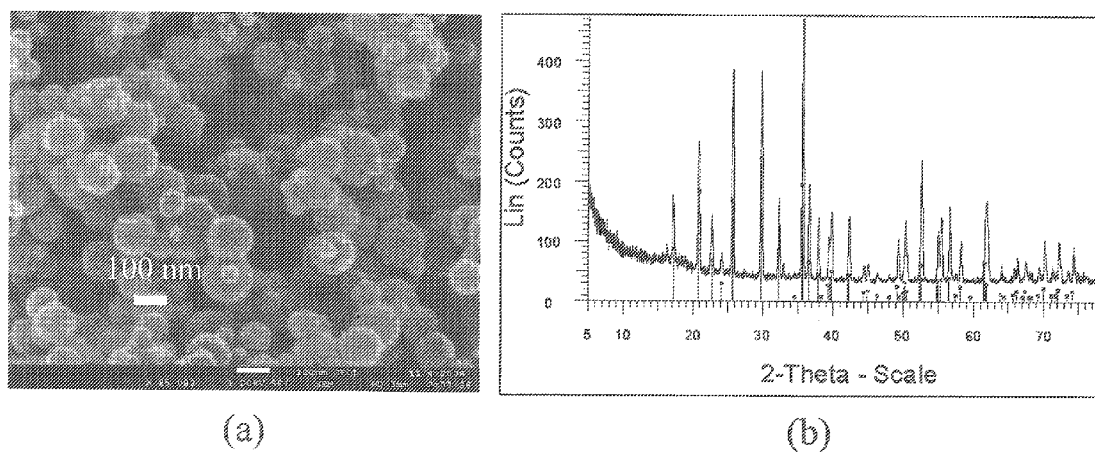
FIG. 9 depicts (a) the particle size and morphological features of spherical LiFePO$_4$ (olivine) electrode particles prepared in an autogenic pressure reactor, and (b) the powder X-ray diffraction pattern of the LiFePO$_4$ (olivine) electrode product depicted in panel (a).

Carbon-coated or carbon-containing lithium-metal-phosphates with the olivine-type structure, such as $LiFePO_4$, $LiNiPO_4$, $LiCoPO_4$, $LiMnPO_4$ were fabricated with the autogenic pressure reactor. Oxalates or acetates of Fe, Co, Ni and Mn were initially ball-milled with $LiH_2PO_4$ for 1 hour and then reacted in the autogenic pressure reactor under nitrogen at about 600-700° C. for a further about 1 hour. When LiFePO$_4$ was prepared by this method, the product consisted of spherical particles on average less than about 100 nm in diameter (FIG. 9, panel (a)), the X-ray diffraction pattern of which showed an essentially single-phase material (FIG. 9, panel (b)).

Figure 10:
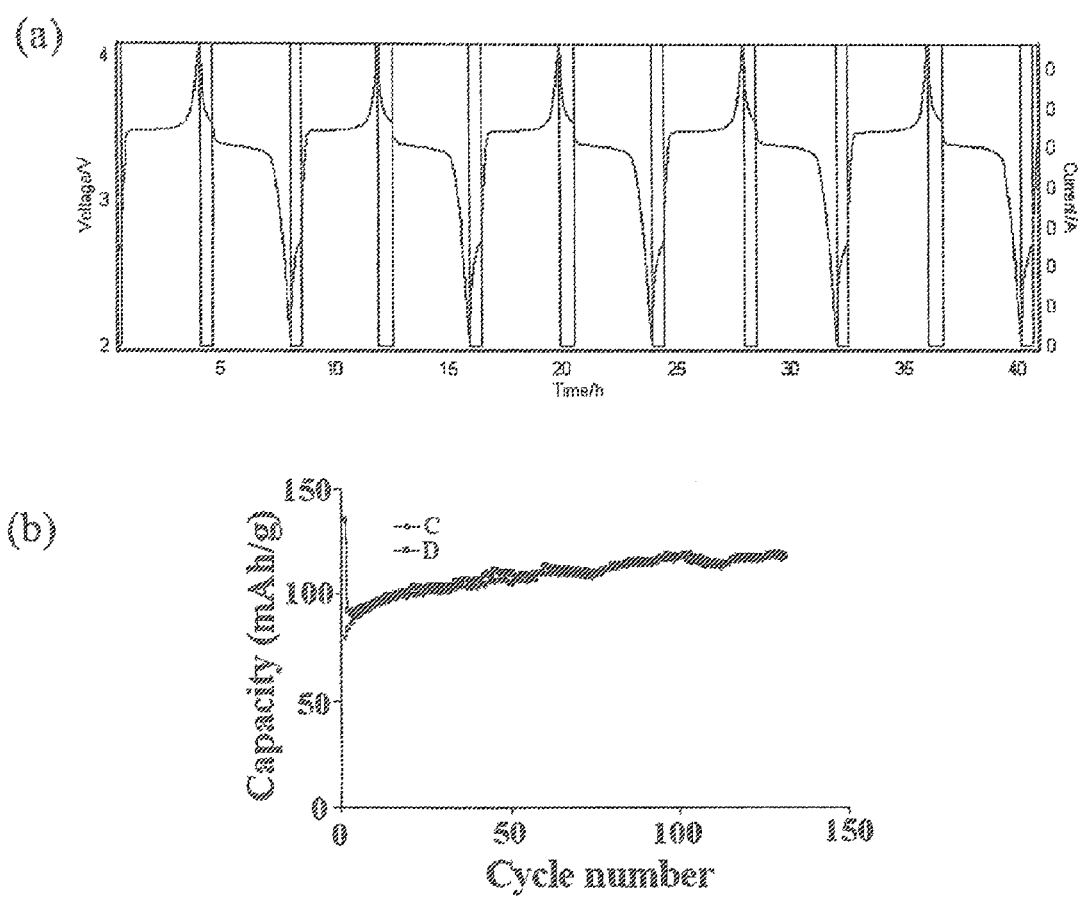
FIG. 10 depicts (a) the typical charge/discharge profiles of a Li/LiFePO$_4$ cell and (b) specific reversible capacity vs. cycle number of the same Li/LiFePO$_4$ electrode on galvanostatic cycling at a C/4 rate.

Carbon-coated LiFePO$_4$ could also be prepared by reacting FePO$_4$ with Li$_2$CO$_3$ in the presence of glucose in an autogenic reaction in an inert nitrogen atmosphere. The electrochemical performance of such carbon-coated LiFePO$_4$ electrodes in a Li/LiFePO$_4$ coin cell, constructed in a similar manner as described in Example 1, is shown in FIG. 10. FIG. 10, panel (a) shows the charge/discharge profiles of the cell when repeatedly charged and discharged in the range of about 4 to about 2 V at a C/4 rate (about 0.08 mA/g), consistent with the expected profile of such cells; the corresponding capacity vs. cycle number plot for the cell is depicted in FIG. 10, panel (b). The capacity of the cell increased steadily on cycling, reaching a specific capacity of about 120 mAh/g for the LiFePO$_4$ electrode after about 130 cycles, demonstrating the utility of the electrode synthesis method of the invention. Carbon-coated lithium-metal phosphate materials made by this method are of particular interest as cathodes for lithium cells and batteries.

EXAMPLE 5

Carbon Spheres

Spherical carbon particles were prepared by the thermal decomposition of about 2 grams of polyethylene based polymer (waste plastic containing hydrocarbons) in an enclosed, but ventable, 10 ml Haynes 230 alloy autoclave reactor under nitrogen.

The thermal decomposition of 2 grams of polyethylene terepthalate polymer in a closed reactor under autogenic (self generating) pressure yielded solid carbon microspheres, approximately 1-5 µm in diameter, as illustrated in the scanning electron microscope images in FIG. 11, panels (a) and (b). Unexpectedly, the particles are almost perfectly spherical in shape and have smooth surfaces. For this synthesis, the reactor was heated at about 700° C. for about 3 hours, during which time a maximum pressure of about 490 psi (about 33.3 atm.) was recorded. Thereafter, the reactor was cooled gradually to room temperature. The product yield was about 50 wt %. The carbon spheres were heated at about 2400° C. under inert conditions for about 1 hour to enhance the graphitic character of the particles.

Figure 13:
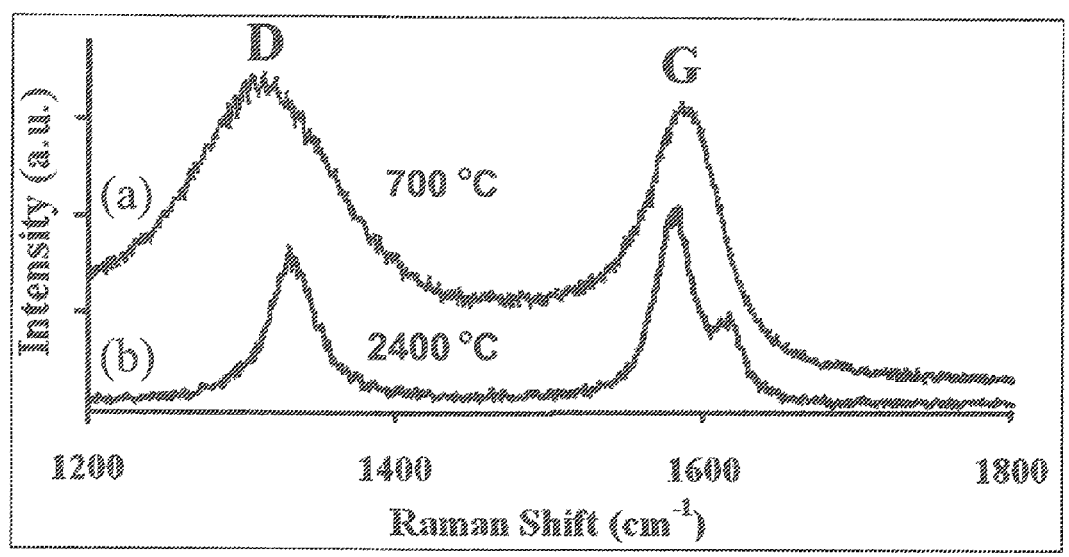
FIG. 13 depicts the Raman spectra of (a) the spherical carbon particles of FIG. 9, and (b) the heated spherical carbon particles of FIG. 12.

Corresponding images of carbon spheres that had been heated at about 2400° C. for about 1 hour in an inert atmosphere are provided in FIG. 12, panels (a) and (b). The data highlight the remarkable stability of the spheres at elevated temperature. The heat treatment process had a negligible effect on the spherical shape, overall morphology of the particles, nor on their solid character, as highlighted by the scanning electron microscopy images of fractured spheres. Gravimetric analyses of SCP samples before and after heating indicated that they had incurred a negligible weight loss (<2%). Analysis of the C and H content showed that the microspheres were comprised of at least about 97 wt % carbon and small amount of hydrogen (<0.4% wt %). The graphitic content within the carbon spheres can be increased and controlled by subsequent heating in an inert atmosphere or under vacuum, for example, about 1000 to about 3000° C., preferably about 2000 to about 3000° C., if desired. In this respect, despite the lack of any visible change to the macroscopic structure and morphology of the individual carbon spheres, Raman spectroscopy and X-ray diffraction were used to probe changes to the character of the carbon structure that may have been induced by heat-treatment at about 2400° C. The Raman spectra of the as-prepared carbon spheres the heated spheres are shown in FIG. 13a, top and bottom, respectively. The spectrum of the as-prepared carbon spheres is typical for a hard carbon, with a broad band centered at about 1315 cm$^{-1}$ representing a highly disordered (D) graphite arrangement within the carbon spheres and a band centered at about 1585 cm$^{-1}$, characteristic of a more ordered graphitic (G) structure. The D band has been attributed to the vibration of carbon atoms with dangling bonds for the in-plane terminated disordered graphite component. The G-band, corresponding to the E2g mode, is closely related to the vibration of sp$^2$ bonded carbon atoms in a 2-dimensional hexagonal lattice, as in graphene. The intensity ratio of the D- and G-bands (ID/IG) of about 1.1 further quantifies the relative levels of disordered glassy carbons, indicating that the processing temperature at which the spheres were synthesized (about 700° C.) was not high enough to allow for the alignment and growth of graphitic sheets within the carbon macrostructure. Heating at about 2400° C. under inert conditions clearly increases the graphitic order within the carbon spheres, as reflected by the significant decrease in the ID/IG ratio to about 0.9 (FIG. 13b, bottom). In this case, the D band is centered at about 1333 cm$^{-1}$, slightly higher than that recorded for the as-prepared sample (about 1315 cm$^{-1}$). More interestingly, the G band is resolved into two components, one centered at about 1577 cm$^{-1}$ (i.e., close to that of the as-prepared spheres, about 1585 cm$^{-1}$) and the other at about 1612 cm$^{-1}$. In one aspect, therefore, this invention relates to rounded carbon materials with turbostratically disordered carbon sheets the Raman spectra of which, in general, show bands centered at about 1300 to about 1350 cm$^{-1}$, at about 1550 to about 1600 cm$^{-1}$ and at about 1600 to about 1650 cm$^{-1}$, although it is anticipated that these ranges will be extended, depending on the amount of disordered carbon and graphitic carbon in the material.

Figure 14:
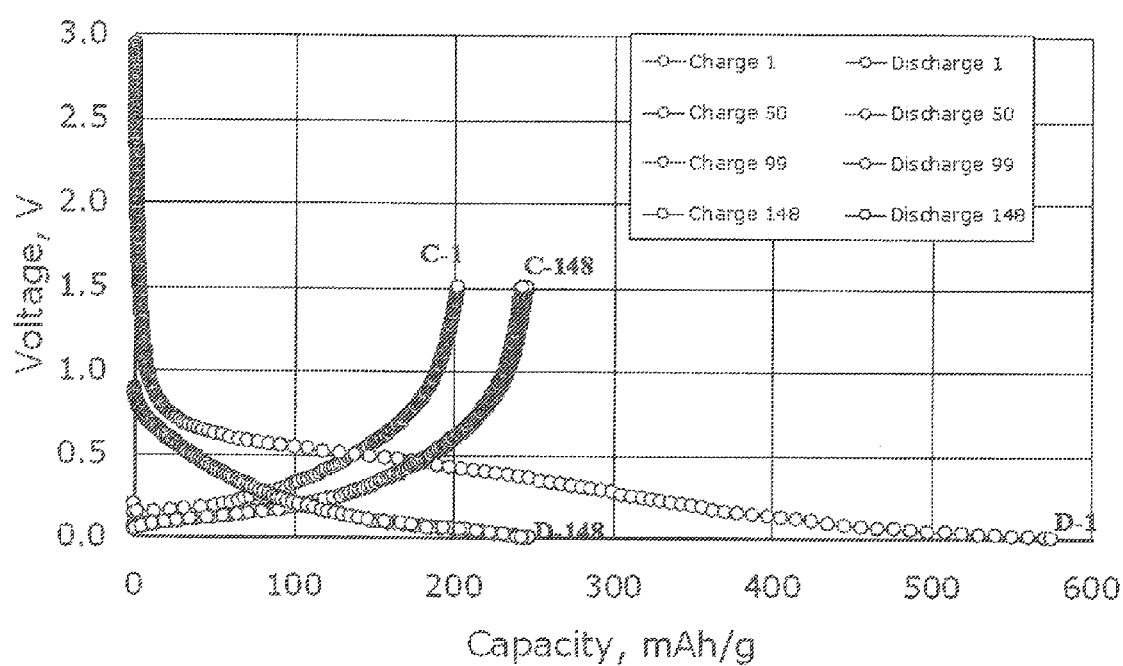
FIG. 14 depicts the electrochemical charge-discharge profiles of a Li/C cell containing the spherical carbon electrode particles of FIG. 11.

The electrochemical properties of carbon sphere electrodes were determined in lithium half cells (coin-type, size 2032) using a lithium foil counter electrode. The carbon electrodes were prepared by coating a slurry consisting of about 92 wt % active carbon spheres and about 8 wt % PVDF as binder on a copper foil. Both electrodes were dried under vacuum for about 12 hours at about 80° C. The electrolyte was a 1.2 M solution of LiPF$_6$ in a 3:7 (by volume) solvent mixture of ethylene carbonate (EC) and ethylmethyl carbonate (EMC). The cells were assembled in a He-filled glove box. Cells were charged and discharged galvanostatically at room temperature at about 1.5 to about 0.005 V at a current density of about 0.25 mA/g. FIG. 14 shows the discharge and charge curves of a typical Li/as-prepared carbon sphere cell. The electrochemical data indicate, after the initial lithiation of the carbon electrode below about 1 V and the formation of a passivating solid electrolyte interphase (SEI) layer and consequent first-cycle irreversible capacity loss, that the capacity of the carbon electrode increased from about 200 mAh/g to a steady 250 mAh/g after 148 cycles. These carbon spheres are therefore of particular interest as anode and current collecting materials for lithium cells and batteries.

Figure 15:
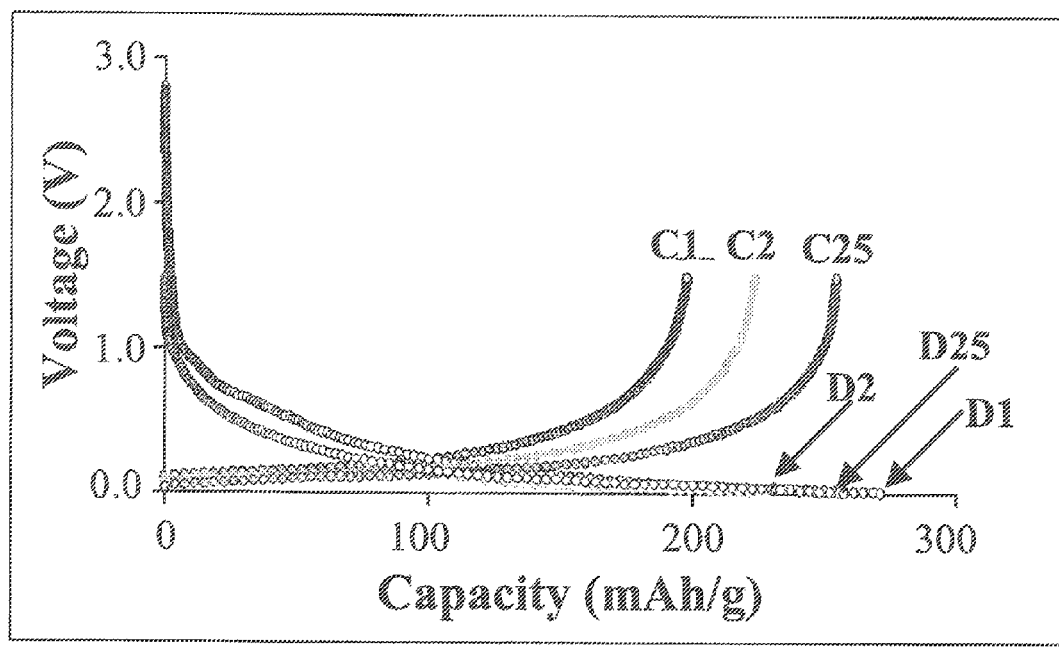
FIG. 15 depicts the electrochemical charge-discharge profiles of a Li/C cell containing the heated spherical carbon electrode particles of FIG. 12.

In general, the capacity delivered by both as-prepared carbon sphere and the heated carbon sphere electrodes, their cycling profiles, and cycling stability was similar (FIGS. 14 and 15). A particular feature of both electrodes was that several break-in cycles were required to reach a stable cycling capacity. For the heated carbon sphere electrodes, the capacity increased steadily on cycling at a C/1 rate to reach approximately 250 mAh/g after 25 cycles, i.e., marginally greater than the capacity of the as-prepared carbon electrodes after the same number of cycles (approximately 236 mAh/g). A noticeable advantage of the heated carbon sphere electrodes was that the heat-treatment process and increase in graphitic order within the carbon spheres significantly reduced the first cycle capacity loss from 60% to approximately 20% (FIG. 15). Surprisingly, the coulombic efficiency of the Li/heated carbon sphere half cells was >99%. A highly attractive and unexpected feature of the autogenic process, therefore, is that it offers the possibility of tailoring the turbostratically-disordered and graphitic character of the carbon spheres, thereby tuning their electrochemical potential, in order to access as much capacity as possible between 1 V and 100 mV (or above) to prevent lithium plating during cell operation.

EXAMPLE 6

Prolate Spheroid Shaped Carbon Particles

The synthesis of prolate-shaped carbon particles was carried out by a controlled autogenic reaction of refined corn oil at about 700° C. under an autogenic pressure of about 4.2 MPa. The scanning electron micrographs (FIG. 16, panel (a)) show that the particles possess an American football shape with polar and equatorial diameters of approximately 3 μm and 1.5 μm, respectively.

Figure 16:
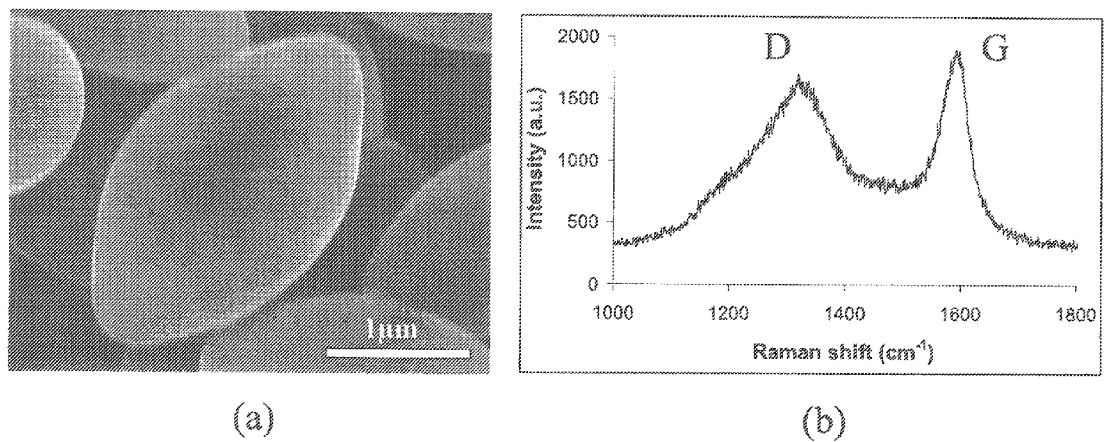
FIG. 16 depicts (a) prolate-shaped carbon particles produced in an autogenic pressure reactor and (b) the Raman spectrum of the particles.

The Raman spectrum of the as-prepared carbon particles with a prolate shape (FIG. 16, panel (b)) shows the presence of a graphitic structure centered at about 1590 $cm^{-1}$ and disordered carbon centered at about 1342 $cm^{-1}$. The peak at 1342 $cm^{-1}$ is usually attributed to the vibration of carbon atoms with dangling bonds for the in-plane terminated disordered graphite, labeled as the D-band. The 1590 $cm^{-1}$ peak (G-band) corresponding to the E 2g mode is closely related to the vibration of all the $sp^2$-bonded carbon atoms in a 2 D hexagonal lattice, as in a graphene layer. The intensity ratio of the D and G bands (ID/IG) of about 0.93 further quantifies the relative levels of disordered and graphitic carbons in the prolate-shaped carbon particles. The arrangements of the graphene layers in these prolate-shaped particles allows lithium insertion and deinsertion to occur effectively and reversibly.

Figure 17:
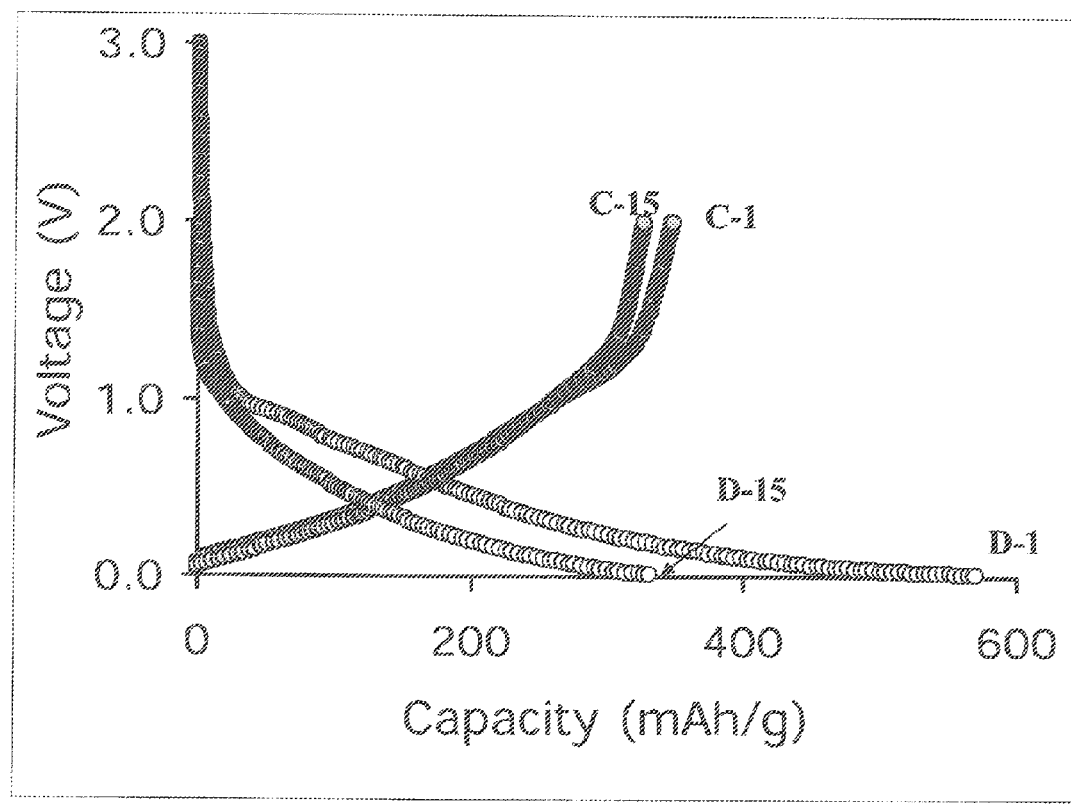
FIG. 17 depicts the charge/discharge voltage profiles of a Li/C cell containing the prolate-shaped carbon electrode particles of FIG. 16.

The electrochemical properties of the prolate-shaped carbon electrodes were determined in lithium half cells (coin-type, size 2032) using a lithium foil counter electrode. The carbon electrodes were prepared by coating a slurry consisting of about 72 wt % of the prolate-shaped carbon particles, 12 wt % carbon black and about 16 wt. % polyvinylidine-difluoride (PVDF) as binder on a copper foil that acted as a current collecting substrate. The as-prepared electrode was dried under vacuum for about 10 hours at about 80° C. The electrolyte was a 1.2 M solution of $LiPF_6$ in a 3:7 (by volume) solvent mixture of ethylene carbonate (EC) and ethylmethyl carbonate (EMC). The cells were assembled in a He-filled glove box. Cells were discharged and charged galvanostatically at room temperature at about 2 to 0.005 V at a current density of about 40 mA/g. FIG. 17 shows the discharge and charge curves of a typical Li/prolate-shaped carbon cell. The formation of a passivating solid electrolyte interphase (SEI) layer occurred below about 1 V during the first discharge. The delivered discharge and charge capacities for the carbon electrodes on the first cycle were about 570 mAh/g and about 346 mAh/g, respectively. The $15^{th}$ cycles discharge and charge capacities were about 331 mAh/g and about 326 mAh/g, respectively, reflecting a surprising 98.5% columbic efficiency. The prolate-shaped carbon electrode particles unexpectedly provided a superior capacity to the carbon sphere electrodes thereby emphasizing their utility as an anode and current collecting properties in lithium cells and batteries.

The carbon materials of this invention also have application in other types of lithium cells, for example, as current collectors in the cathodes of lithium-polymer and lithium-sulfur cells.

EXAMPLE 7

Carbon Nanotubes

Figure 18:
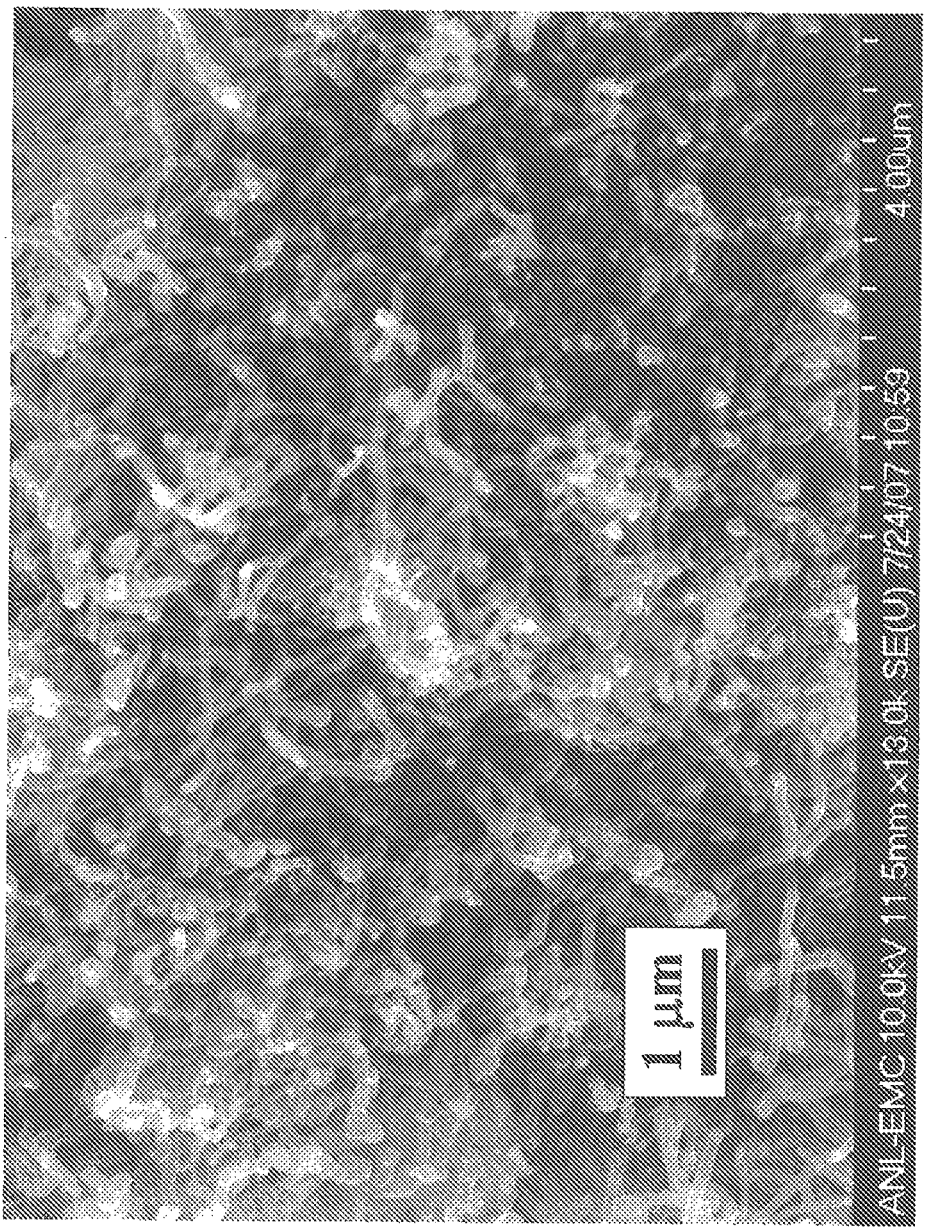
FIG. 18 depicts carbon nanotubes produced in an autogenic pressure reactor according to the present invention.

Unlike the spherical carbon electrode morphology that was created by the thermal decomposition of polyethylene terepthalate polymer at in the autogenic pressure reactor, as described in Example 4 above, it was discovered that a carbon nanotube electrode morphology could be created by the thermal decomposition of low density polyethylene containing about 20 wt % of a cobalt acetate catalyst in the autogenic pressure reactor under a nitrogen atmosphere at about 700° C. for about 2 hours (FIG. 18). During this process, when the reactor was filled to one quarter of its capacity, the autogenic pressure within the reactor reached about 1200 psi at about 700° C.

Figure 19:
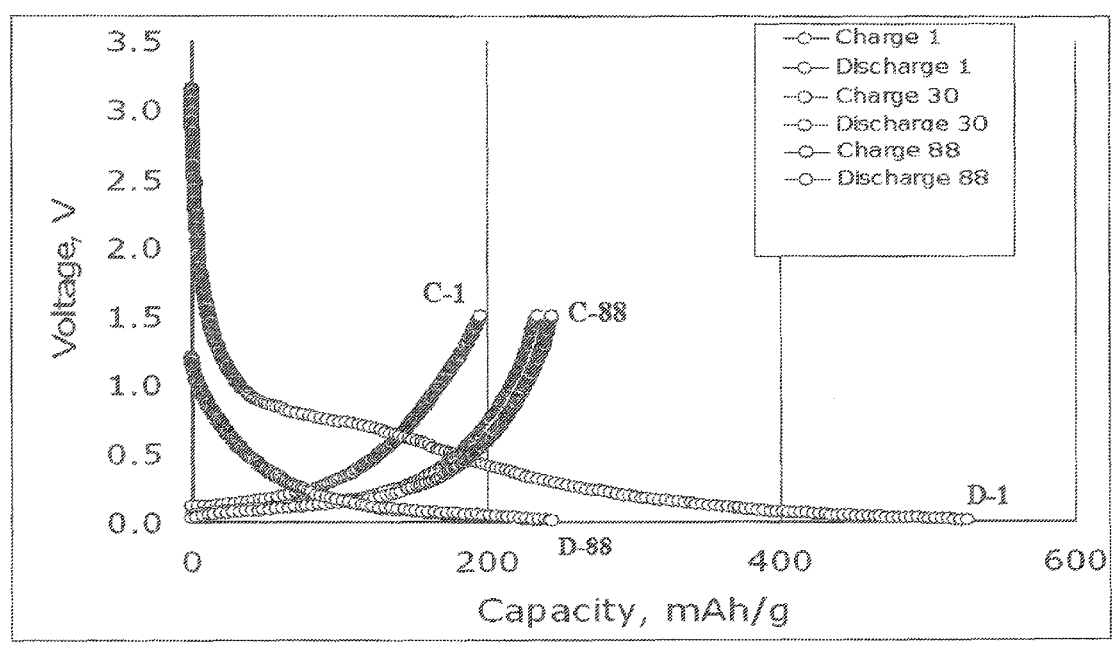
FIG. 19 depicts the electrochemical charge-discharge profiles of a Li/C cell containing the carbon nanotube electrode particles of FIG. 18.

The electrochemical behavior of a Li/carbon nanotube half cell, constructed in the same manner as the cell described in Example 3, is shown in FIG. 19. The cell was charged and discharged at about 1.5 to about 0.005 V at a C/1 current rate (about 0.08 mA/g). The voltage response was similar to that observed for the carbon sphere electrodes of Example 4. After the initial cycle, the carbon nanotube electrode delivered a capacity of just less than 200 mAh/g, which increased steadily to reach approximately 250 mAh/g after 88 cycles, demonstrating the utility of this type of carbon electrode in a non-aqueous lithium cell. These carbon nanotubes are therefore of particular interest as anode and current collecting materials for lithium cells and batteries.

EXAMPLE 8

Carbon Nanotube—$TiO_2$ and Carbon Nanotube—Si Materials

The carbon nanotubes prepared in Example 6 were used as a template for depositing nanoparticulate $TiO_2$ and Si to create carbon nanotube—$TiO_2$ and carbon nanotube—Si 'hybrid' electrode materials in which the carbon nanotube component provided not only electrochemical capacity to the electrode but also electrical connectivity between the electroactive, nanoparticulate $TiO_2$ and Si components. For example, about 1.3 g of a titanium precursor, $(C_5H_8O_2)_2TiO$, was dissolved in about 20 ml of water. The aqueous solution was sonicated in a bath with the addition of about 130 mg of carbon nanotubes. After about 20 minutes of ultrasonication, the water was evaporated and the resultant dry powder heated in the autogenic pressure reactor at about 400° C. in an air atmosphere for about 2 hours. The product of this reaction consisted of nanosized (<10 nm) titania particles that decorated the surfaces of the carbon nanotubes. Elemental mapping confirmed the presence of Ti, O and C throughout this nano-composite material. An analogous experiment was conducted whereby triethylsilane, $(C_2H_5)_3SiH$, was decomposed in presence of pre-prepared carbon nanotubes in the autogenic pressure reactor in an inert argon atmosphere at approximately about 650° C. for about 2 hours to decorate the surface of the carbon nanotubes with nano-sized Si particles. By analogy to the materials prepared by autogenic reactions, as described hereinbefore, such products have application as anode and current collecting materials in lithium cells and batteries.

Whereas this specification and the examples provided herein pertain specifically to electrode materials for non-aqueous lithium cells and batteries, including lithium ion, lithium-polymer, lithium-sulfur cells and batteries, it will be obvious to those skilled in the art that the invention pertains also to electrode materials for cells and batteries using aqueous electrolytes, such as alkaline $Zn/MnO_2$ and nickel-metal hydride cells and batteries, as well as to other energy storage devices such as supercapacitors with either aqueous or non-aqueous electrolytes and fuel cells.

Figure 20:
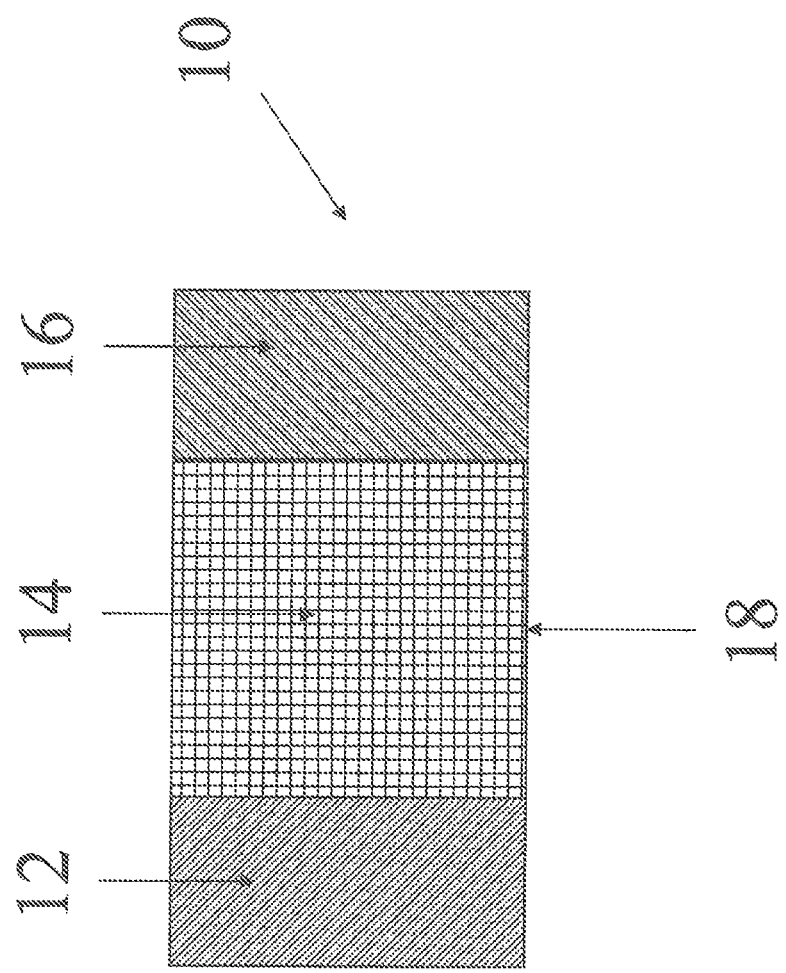
FIG. 20 depicts a schematic representation of an electrochemical cell.
Figure 21:
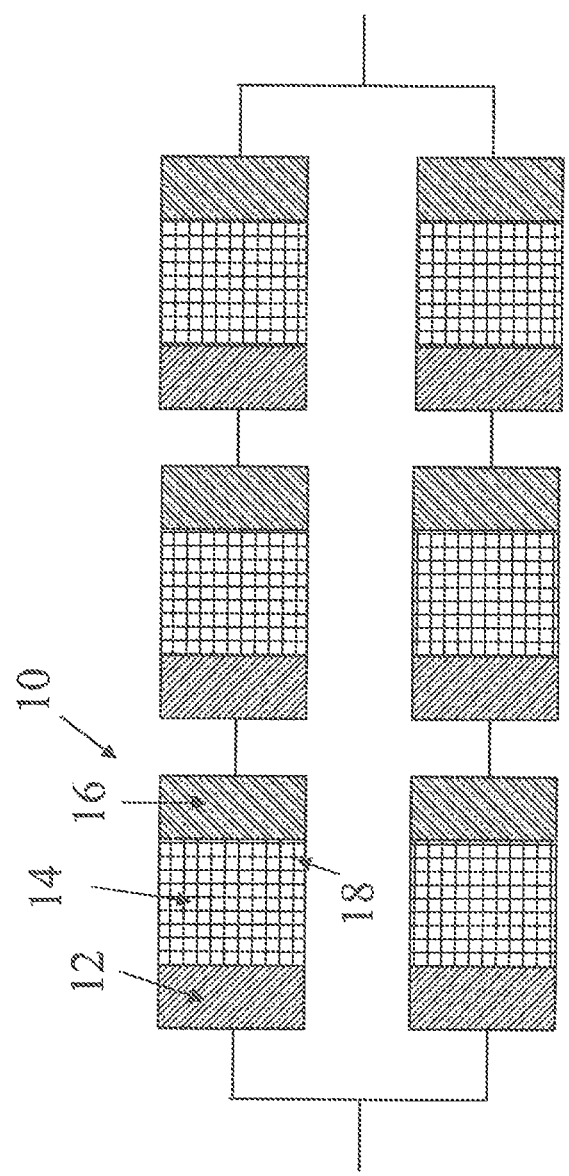
FIG. 21 depicts a schematic representation of a battery consisting of a plurality of cells connected electrically in series and in parallel.

This invention, therefore, relates to a method for synthesizing variety of materials using an autogenic process reactor for electrochemical energy storage electrodes, such as those used in an electrochemical cell, shown schematically in FIG. 20, the cell represented by the numeral 10 having a negative electrode 12 separated from a positive electrode 16 by an electrolyte 14, all contained in an insulating housing 18 with suitable terminals (not shown) being provided in electronic contact with the negative electrode 12 and the positive electrode 16. Binders and other materials normally associated with both the electrolyte and the negative and positive electrodes are well known in the art and are not described herein, but are included as is understood by those of ordinary skill in this art. FIG. 21 shows a schematic illustration of one example of a battery in which two strings of electrochemical cells 10, described above, are arranged in parallel, each string comprising three cells 10 arranged in series.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments of the invention in which an exclusive property or privilege is claimed are defined as follows:

1. A lithium or lithium-ion electrochemical cell comprising a cathode, an anode, and a non-aqueous lithium-containing electrolyte therebetween, wherein one or more of the anode and the cathode comprises at least one particulate carbon-containing material selected from the group consisting of:
   (a) a particulate metal oxide/carbon composite material comprising metal oxide core particles coated with carbon, the metal oxide comprising one or more ions selected from the group consisting of Ti, Fe, Mn, Co, Ni, Mo, W, In, and Sn, optionally in combination with Li ions,
   (b) a particulate metal/carbon composite material comprising metal core particles coated with carbon, the core comprising one or more metal that can alloy with Li selected from the group consisting of Mg, Al, Ga, In, Sn, and Sb, and
   (c) a particulate metal phosphate/carbon composite material__ comprising metal phosphate core particles coated with carbon, wherein the metal phosphate comprises one or more ions selected from the group consisting of Ti, V, Mn, Ni, and Co, optionally in combination with Li ions;
   and wherein the particulate carbon-containing material is prepared by heating one or more precursor materials in a sealed autogenic pressure reactor at a temperature and for a period of time sufficient to dissociate the one or more precursor material into at least one gaseous component and thereby generate a pressure sufficient for components of the dissociated precursor material to combine and form the particulate carbon-containing material; wherein the combined amount and combined chemical composition of each precursor material in the reactor is sufficient to form the particulate carbon-containing material.

2. The electrochemical cell of claim 1 in which carbon-containing material is a stoichiometric, defect, or disordered material with respect to composition and atomic, cationic or anionic sites.

3. The electrochemical cell of claim 1 in which the reactor is operated under conditions ranging from a minimum working pressure of about 100 pounds per square inch and a minimum temperature of about 100° C., to a maximum working pressure of about 2000 pounds per square inch and a maximum temperature of about 800° C.

4. The electrochemical cell of claim 3 in which the reactor is operated under conditions ranging from a minimum working pressure of about 100 pounds per square inch and a minimum temperature of about 100° C., to a maximum working pressure of about 1200 pounds per square inch and a maximum temperature of about 600° C.

5. The electrochemical cell of claim 4 in which the reactor is operated under conditions ranging from a minimum working pressure of about 100 pounds per square inch and a minimum temperature of about 100° C., to a maximum working pressure of about 800 pounds per square inch and a maximum temperature of about 300° C.

6. The electrochemical cell of claim 1 wherein the particulate carbon-containing material is a carbon-coated metal oxide or metal phosphate nanoparticle material comprising particles having a titanium oxide core, a tin oxide core, or a $LiMPO_4$ olivine core coated with about 0.5 to about 30 percent by weight of carbon, the particles having a size in the range of about 5 to about 150 nm, and wherein M comprises one or more metals selected from the group consisting of Fe, Mn, Ni and Co.

7. The electrochemical cell of claim 6 wherein the particulate carbon-containing material is prepared by reacting one or more solid or liquid, solvent-free chemical precursor materials in an enclosed autogenic pressure reactor in which the precursor materials are dissociated and reacted at elevated temperature, thereby creating self-generated pressure within the reactor; the precursor materials comprising one or more precursor compounds comprising carbon, oxygen and any other elements making up the nanoparticle material; the reactor operating under conditions ranging from a minimum working pressure of about 100 pounds per square inch and a minimum temperature of about 100° C., to a maximum working pressure in the range of about 800 to about 2000 pounds per square inch and a maximum temperature in the range of about 300 to about 800° C.

8. The electrochemical cell of claim 1 wherein the particulate carbon-containing material comprises a carbon-coated metal oxide nanoparticle material comprising titanium dioxide core particles coated with about 0.5 to about 30 percent by weight of carbon, the nanoparticle material having a size in the range of about 5 to about 150 nm, and wherein the titanium dioxide core particles are predominately single phase anatase $TiO_2$.

9. The electrochemical cell of claim 8 wherein the carbon-coated metal oxide nanoparticle material is prepared by reacting one or more solid, solvent-free titanium carboxylate precursor materials in an enclosed autogenic pressure reactor in which the precursor materials are dissociated and reacted at elevated temperature, thereby creating self-generated pressure within the reactor; and optionally including an additional step of heating the product obtained from the autogenic pressure reactor in air to reduce the amount of carbon coating the product; the reactor operating under conditions ranging from a minimum working pressure of about 100 pounds per square inch and a minimum temperature of about 100° C., to a maximum working pressure in the range of about 800 to about 2000 pounds per square inch and a maximum temperature in the range of about 300 to about 800° C.

10. The electrochemical cell of claim 1 wherein the particulate carbon-containing material comprises a carbon-coated metal oxide nanoparticle material comprising tin dioxide core particles having a size in the range of about 5 to about 20 nm, coated with about 1 to about 4 nm of carbon, and wherein the tin dioxide core particles are predominately cassiterite-type $SnO_2$.

11. The electrochemical cell of claim 10 wherein the carbon-coated metal oxide nanoparticle material is prepared by reacting one or more solid, solvent-free tin alkoxylate precursor materials in an enclosed autogenic pressure reactor in which the precursor materials are dissociated and reacted at elevated temperature, thereby creating self-generated pressure within the reactor; and optionally including an additional step of heating the product obtained from the autogenic pressure reactor in air to reduce the amount of carbon coating the product;

and the reactor operates under conditions ranging from a minimum working pressure of about 100 pounds per square inch and a minimum temperature of about 100° C., to a maximum working pressure in the range of about 800 to about 2000 pounds per square inch and a maximum temperature in the range of about 300 to about 800° C.

12. The electrochemical cell of claim 1 wherein the particulate carbon-containing material comprises a carbon-coated metal phosphate nanoparticle material comprising $LiMPO_4$ olivine core particles coated with about 5 to about 30 percent by weight of carbon, the nanoparticulate material having a size in the range of about 5 to about 150 nm, and wherein M comprises one or more metals selected from the group consisting of Fe, Mn, Ni and Co.

13. The electrochemical cell of claim 12 wherein the carbon-coated metal phosphate nanoparticle material is prepared by reacting one or more solid, solvent-free precursor materials in an enclosed autogenic pressure reactor in which the precursor materials are dissociated and reacted at elevated temperature, thereby creating self-generated pressure within the reactor; and optionally including an additional step of heating the product obtained from the autogenic pressure reactor in air to reduce the amount of carbon coating the product, wherein the precursor materials include at one or more compounds comprising carbon, oxygen, phosphate, Li, and a metal selected from Fe, Mn, Ni or Co; and the reactor operates under conditions ranging from a minimum working pressure of about 100 pounds per square inch and a minimum temperature of about 100° C., to a maximum working pressure in the range of about 800 to about 2000 pounds per square inch and a maximum temperature in the range of about 300 to about 800° C.

14. The electrochemical cell of claim 13 wherein the precursor materials comprise a Fe, Mn, Ni or Co carboxylate and a lithium phosphate salt.

15. The electrochemical cell of claim 13 wherein the precursor materials comprise a Fe, Mn, Ni or Co phosphate and a lithium carbonate salt.

16. A battery comprising a plurality of electrochemical cells of claim 1 arranged in parallel, in series, or both.

17. A method for fabricating a carbon-coated particulate metal oxide, metal phosphate, metal, or metalloid material suitable for use in an electrochemical cell, comprising heating one or more precursor materials in a sealed autogenic pressure reactor at a temperature and for a period of time sufficient to dissociate the one or more precursor material into at least one gaseous component and thereby generate a pressure sufficient for components of the dissociated precursor material to combine and form the carbon-coated particulate material.

18. The method of claim 17 wherein the particulate carbon-containing material comprises a carbon-coated metal oxide nanoparticle material comprising titanium dioxide core particles coated with about 0.5 to about 30 percent by weight of carbon, the nanoparticle material having a size in the range of about 5 to about 150 nm, the titanium dioxide core particles are predominately single phase anatase $TiO_2$, and wherein the carbon-coated metal oxide nanoparticle material is prepared by reacting one or more solid, solvent-free titanium carboxylate precursor materials in an enclosed autogenic pressure reactor in which the precursor materials are dissociated and reacted at elevated temperature, thereby creating self-generated pressure within the reactor; and optionally including an additional step of heating the product obtained from the autogenic pressure reactor in air to reduce the amount of carbon coating the product; the reactor operating under conditions ranging from a minimum working pressure of about 100 pounds per square inch and a minimum temperature of about 100° C., to a maximum working pressure in the range of about 800 to about 2000 pounds per square inch and a maximum temperature in the range of about 300 to about 800° C.

19. The method of claim 17 wherein the particulate carbon-containing material comprises a carbon-coated metal oxide nanoparticle material comprising tin dioxide core particles having a size in the range of about 5 to about 20 nm, coated with about 1 to about 4 nm of carbon, the tin dioxide core particles are predominately cassiterite-type $SnO_2$, and wherein the carbon-coated metal oxide nanoparticle material is prepared by reacting one or more solid, solvent-free tin alkoxylate precursor materials in an enclosed autogenic pressure reactor in which the precursor materials are dissociated and reacted at elevated temperature, thereby creating self-generated pressure within the reactor; and optionally including an additional step of heating the product obtained from the autogenic pressure reactor in air to reduce the amount of carbon coating the product; and the reactor operates under conditions ranging from a minimum working pressure of about 100 pounds per square inch and a minimum temperature of about 100° C., to a maximum working pressure in the range of about 800 to about 2000 pounds per square inch and a maximum temperature in the range of about 300 to about 800° C.

20. The method of claim 17 wherein the particulate carbon-containing material comprises a carbon-coated metal phosphate nanoparticle material comprising $LiMPO_4$ olivine core particles coated with about 5 to about 30 percent by weight of carbon, the nanoparticulate material having a size in the range of about 5 to about 150 nm, M comprises one or more metals selected from the group consisting of Fe, Mn, Ni and Co, and wherein the carbon-coated metal phosphate nanoparticle material is prepared by reacting one or more solid, solvent-free precursor materials in an enclosed autogenic pressure reactor in which the precursor materials are dissociated and reacted at elevated temperature, thereby creating self-generated pressure within the reactor; and optionally including an additional step of heating the product obtained from the autogenic pressure reactor in air to reduce the amount of carbon coating the product, wherein the precursor materials include at one or more compounds comprising carbon, oxygen, phosphate, Li, and a metal selected from Fe, Mn, Ni or Co; and the reactor operates under conditions ranging from a minimum working pressure of about 100 pounds per square inch and a minimum temperature of about 100° C., to a maximum working pressure in the range of about 800 to about 2000 pounds per square inch and a maximum temperature in the range of about 300 to about 800° C.

\* \* \* \* \*